(12) United States Patent
Rittinger et al.

(10) Patent No.: US 9,922,300 B2
(45) Date of Patent: Mar. 20, 2018

(54) ENTERPRISE PERFORMANCE MANAGEMENT PLANNING OPERATIONS AT AN ENTERPRISE DATABASE

(71) Applicants: Jan Rittinger, Walldorf (DE); Bernhard Jaecksch, Walldorf (DE); Daniel Merkel, Walldorf (DE); Gerrit Simon Kazmaier, Metzingen (DE); Lars Volker, Walldorf (DE); Stefan Uhrig, Walldorf (DE); Yeonghee Choi, Seoul (KR)

(72) Inventors: Jan Rittinger, Walldorf (DE); Bernhard Jaecksch, Walldorf (DE); Daniel Merkel, Walldorf (DE); Gerrit Simon Kazmaier, Metzingen (DE); Lars Volker, Walldorf (DE); Stefan Uhrig, Walldorf (DE); Yeonghee Choi, Seoul (KR)

(73) Assignee: SAP SE, Walldorf (DE)

( * ) Notice: Subject to any disclaimer, the term of this patent is extended or adjusted under 35 U.S.C. 154(b) by 426 days.

(21) Appl. No.: 14/151,488

(22) Filed: Jan. 9, 2014

(65) Prior Publication Data
US 2015/0149258 A1 May 28, 2015

Related U.S. Application Data

(60) Provisional application No. 61/909,003, filed on Nov. 26, 2013.

(51) Int. Cl.
*G06Q 10/00* (2012.01)
*G06Q 10/06* (2012.01)

(52) U.S. Cl.
CPC .............. *G06Q 10/0637* (2013.01)

(58) Field of Classification Search
CPC ......... G06Q 10/00–50/00; G06Q 90/00–99/00
USPC .............................. 705/7.11–7.42
See application file for complete search history.

(56) References Cited

U.S. PATENT DOCUMENTS

| | | | | |
|---|---|---|---|---|
| 5,983,020 A | * | 11/1999 | Sweeney | G06F 8/4435 706/47 |
| 6,047,284 A | * | 4/2000 | Owens | G06F 17/30607 |
| 6,397,195 B1 | * | 5/2002 | Pinard | G06Q 40/02 235/379 |
| 6,480,857 B1 | * | 11/2002 | Chandler | G06F 17/30595 707/792 |
| 6,502,103 B1 | * | 12/2002 | Frey | G06F 9/465 |
| 6,505,205 B1 | * | 1/2003 | Kothuri | G06F 17/30327 |

(Continued)

OTHER PUBLICATIONS

Ailamaki, Surajit Chaudhuri, et al. "Data Engineering."*

(Continued)

*Primary Examiner* — Alan S Miller
(74) *Attorney, Agent, or Firm* — Buckley, Maschoff & Talwalkar LLC

(57) ABSTRACT

According to some embodiments, input data may be received from a data source in an enterprise database in accordance with an enterprise performance management planning model, stored by a processor at the enterprise database. An operation may then be performed on the input data to produce a result. The result may then be stored in a data target, wherein the data target points to a data holding entity in an instantiation of a plan data container at the enterprise database.

21 Claims, 23 Drawing Sheets

(56) References Cited

U.S. PATENT DOCUMENTS

| | | | |
|---|---|---|---|
| 6,507,834 B1* | 1/2003 | Kabra | G06F 17/30415 703/3 |
| 7,483,901 B1* | 1/2009 | Massoudi | G06F 9/541 |
| 7,809,768 B2* | 10/2010 | Owens | G06F 17/30607 707/803 |
| 8,204,809 B1* | 6/2012 | Wise | G06Q 40/00 705/35 |
| 8,219,524 B2* | 7/2012 | Gokhale | G06F 17/30902 707/610 |
| 8,341,191 B2* | 12/2012 | Weinberg | G06F 17/30607 707/791 |
| 8,489,811 B1* | 7/2013 | Corbett | G06F 17/30233 707/827 |
| 8,555,018 B1* | 10/2013 | Rohr | G06F 3/0605 707/758 |
| 8,655,754 B2* | 2/2014 | Zwiebach | G06Q 40/12 705/30 |
| 8,682,876 B2* | 3/2014 | Shamlin | G06F 17/30566 707/703 |
| 8,762,233 B2* | 6/2014 | Gelerman | G06F 21/6218 705/30 |
| 8,959,050 B2* | 2/2015 | Ng | G06F 17/30557 707/610 |
| 2002/0133368 A1* | 9/2002 | Strutt | G06F 17/30592 705/7.11 |
| 2002/0145040 A1* | 10/2002 | Grabski, III | G06Q 40/02 235/385 |
| 2003/0149650 A1* | 8/2003 | Yeh | G06Q 40/00 705/35 |
| 2003/0204514 A1* | 10/2003 | Owens | G06F 17/30607 |
| 2003/0229530 A1* | 12/2003 | Lai | G06Q 10/06315 705/7.25 |
| 2003/0236721 A1* | 12/2003 | Plumer | G06Q 40/12 705/30 |
| 2004/0034669 A1* | 2/2004 | Smith | G06F 17/30578 |
| 2004/0181518 A1* | 9/2004 | Mayo | G06F 17/30592 |
| 2005/0028083 A1* | 2/2005 | Kircher | G06F 17/3089 715/256 |
| 2005/0165668 A1* | 7/2005 | Hinkle | G06Q 40/00 705/37 |
| 2005/0209942 A1* | 9/2005 | Ballow | G06Q 40/06 705/35 |
| 2005/0209943 A1* | 9/2005 | Ballow | G06Q 10/10 705/35 |
| 2005/0209944 A1* | 9/2005 | Ballow | G06Q 10/0637 705/35 |
| 2005/0256789 A1* | 11/2005 | Matsuoka | G06Q 40/12 705/30 |
| 2005/0278295 A1* | 12/2005 | Bernet | G06Q 40/02 |
| 2006/0167704 A1* | 7/2006 | Nicholls | G06Q 10/06393 705/7.39 |
| 2006/0253372 A1* | 11/2006 | Leffler | G06Q 40/04 705/37 |
| 2007/0203944 A1* | 8/2007 | Batra | G06F 17/30575 |
| 2007/0226027 A1* | 9/2007 | Chang | G06Q 10/06314 705/7.24 |
| 2007/0239660 A1* | 10/2007 | Tien | G06Q 10/10 |
| 2007/0239769 A1* | 10/2007 | Fazal | G06F 17/30554 |
| 2008/0104083 A1* | 5/2008 | Woods | G06F 17/3007 |
| 2008/0120129 A1* | 5/2008 | Seubert | G06Q 10/06 705/35 |
| 2008/0301155 A1* | 12/2008 | Borgsmidt | G06Q 10/04 |
| 2009/0204515 A1* | 8/2009 | Zwiebach | G06Q 40/12 705/30 |
| 2010/0076961 A1* | 3/2010 | Dettinger | G06F 17/3043 707/722 |
| 2010/0125565 A1* | 5/2010 | Burger | G06F 17/30433 707/713 |
| 2011/0161371 A1* | 6/2011 | Thomson | G06F 17/30398 707/792 |
| 2011/0161733 A1* | 6/2011 | Thomson | G06F 8/30 714/16 |
| 2011/0161941 A1* | 6/2011 | Thomson | G06F 8/34 717/140 |
| 2011/0167033 A1* | 7/2011 | Strelitz | G06F 17/30312 707/602 |
| 2011/0184924 A1* | 7/2011 | Toews | G06F 17/30893 707/704 |
| 2012/0174113 A1* | 7/2012 | Pohlmann | G06F 9/5088 718/104 |
| 2013/0013345 A1 | 1/2013 | Wallquist et al. | |
| 2013/0073521 A1* | 3/2013 | Ng | G06F 17/30557 707/610 |
| 2013/0151680 A1* | 6/2013 | Salinas | G06F 17/30557 709/223 |
| 2013/0159339 A1* | 6/2013 | Thomsen | G06F 17/30106 707/769 |
| 2013/0262074 A1* | 10/2013 | Heidasch | G06F 17/30522 703/22 |
| 2013/0262425 A1* | 10/2013 | Shamlin | G06F 9/5072 707/703 |
| 2013/0262522 A1* | 10/2013 | van Rotterdam | G06F 17/30289 707/802 |
| 2013/0332694 A1* | 12/2013 | Reissner | G06F 3/0644 711/172 |
| 2014/0095530 A1* | 4/2014 | Lee | G06F 11/1471 707/769 |
| 2014/0188918 A1* | 7/2014 | Shamlin | G06F 17/30539 707/756 |

OTHER PUBLICATIONS van den Heuvel, Willem-Jan, and Michael Papazoglou. "Bridging legacy and business components with parameterizable business objects: The bales methodology." Business Object Design and Implementation III. Springer London, 1999. 13-24.*

Strauch, Steve, et al. "Enabling tenant-aware administration and management for JBI environments." Service-Oriented Computing and Applications (SOCA), 2012 5th IEEE International Conference on. IEEE, 2012.*

Candan, K. Selcuk, et al. "At the frontiers of information and software as services." New Frontiers in Information and Software as Services. Springer Berlin Heidelberg, 2011. 283-300.*

Aulbach, Stefan, et al. "Multi-tenant databases for software as a service: schema-mapping techniques." Proceedings of the 2008 ACM SIGMOD international conference on Management of data. ACM, 2008.*

"Communication: Extended European Search Report", dated Jun. 25, 2015 (Jun. 25, 2015), for European Application No. 14003532.0-1958, 7pgs.

* cited by examiner

ENTERPRISE PERFORMANCE MANAGEMENT PLANNING OPERATIONS AT AN ENTERPRISE DATABASE

CROSS-REFERENCE TO RELATED APPLICATION

The present application claims the benefit of U.S. Provisional Patent Application No. 61/909,003 entitled "ENTERPRISE PERFORMANCE MANAGEMENT PLANNING OPERATIONS AT AN ENTERPRISE DATABASE" and filed Nov. 26, 2013. The entire contents of that application are incorporated herein by reference.

FIELD

Some embodiments relate to database systems. In particular, some embodiments concern an enterprise performance management planning operations at an enterprise database.

BACKGROUND

A business or enterprise may be interested in planning for future operations. For example, an enterprise might want to decide if new employees should be added to the business or if another manufacturing plant should be built. To facilitate this type of business planning, predicted values of future business data elements may be generated. For example, a business might predict future sales values (e.g., on a region-by-region basis as well as an overall sales value), profits, etc. Note that predicted future business values may be based on prior actual business values. For example, a business might predict or project that revenues next year will increase 5% as compared to this year's actual revenue.

Typically, an enterprise database storing actual business data may be used by a planning application executing at an application server to generate business predictions. The planning application may request actually business data then use those values to generate predicted data at the application server. The predicted data may then be included in reports, displays, etc. to facilitate business planning. Such an approach, however, may have performance implications. For example, substantial amounts of data may be transferred from the database to the application server and/or mass operations may need to be performed at the application server. Thus, it may be desirable to facilitate implementation of business planning in connection with an enterprise database in an efficient and accurate manner.

DETAILED DESCRIPTION

A business or enterprise may be interested in planning for future operations. For example, an enterprise might want to decide if new employees should be added to the business or if another manufacturing plant should be built. To facilitate this type of business planning, predicted or other values of future business data elements may be generated. For example, a business might predict future sales values (e.g., on a region-by-region basis as well as an overall sales value), profits, etc. Note that predicted future business values may be based on prior actual business values. For example, a business might predict or project that revenues next year will increase 5% as compared to this year's actual revenue.

Figure 1:
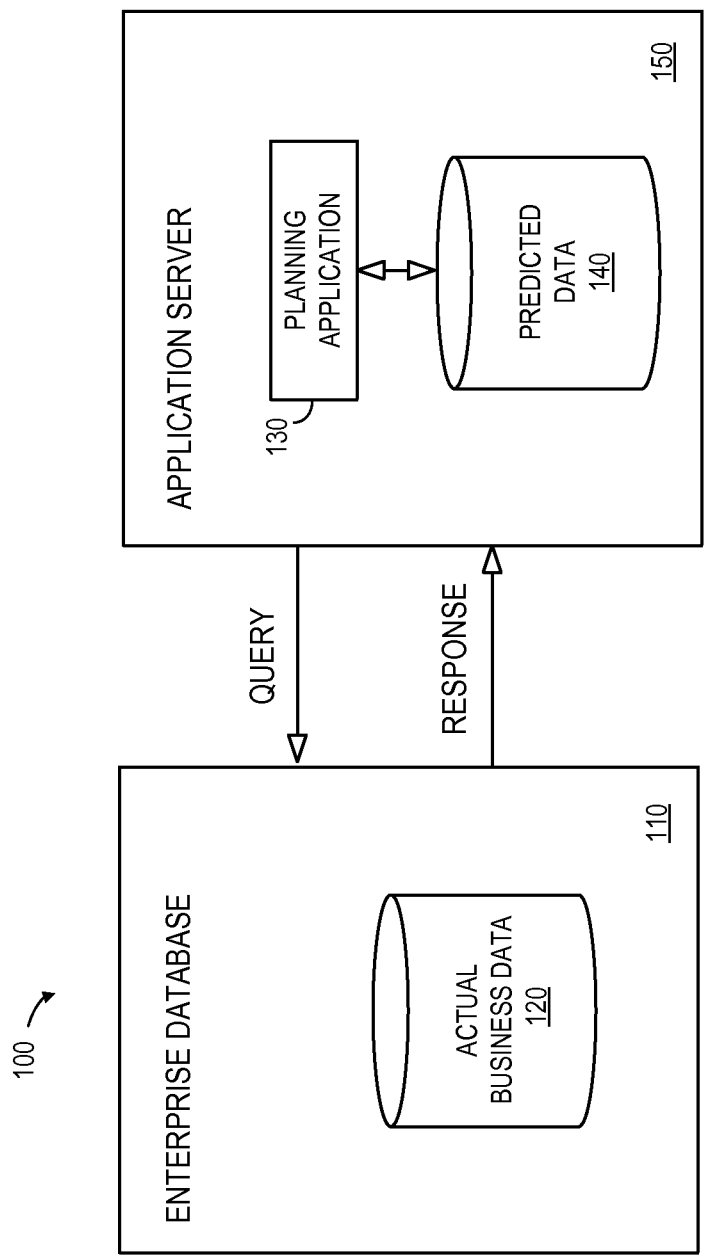
FIG. 1 is a diagram illustrating the use of an application server to generate business predictions.

FIG. 1 is a diagram 100 illustrating how an enterprise database 110 storing actual business data 120 may be used by a planning application executing at an application server 150 to generate business predictions. Typically, the planning application 130 may cause a query to be transmitted from the application server to the enterprise database 110. The query might request, for example, how much taxes were paid in a particular country in each of the last five years. The enterprise database 110 may retrieve the information transmit a response with those values to the application server 150. The planning application 130 may then use those values to generate predicted data 140 at the application server 150. The predicted data 140 may then be included in reports, displays, etc. to facilitate business planning.

Figure 2:
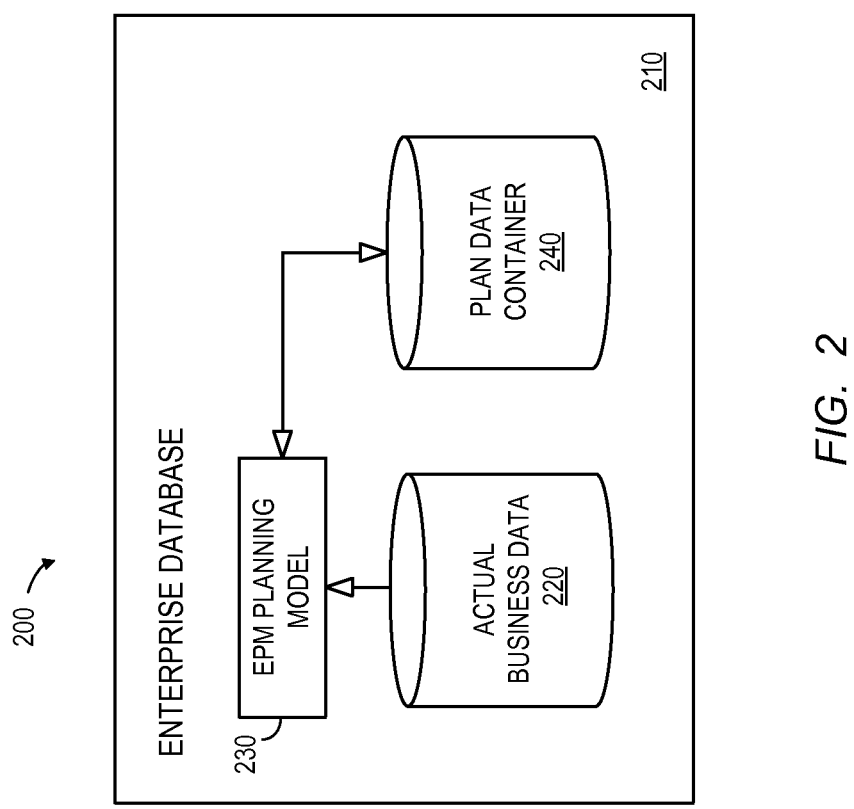
FIG. 2 is a block diagram of a system according to some embodiments of the present invention.

Such an approach, however, may have performance implications. For example, substantial amounts of data may be transferred from the enterprise database 110 to the application server 150 and/or mass operations may need to be performed at the application server 150. According to some embodiments described herein, when only a fraction of the data may need to be displayed (e.g., at an aggregated level), and mass operations might be performed at the enterprise database 110, where the substantial amount of data resides, and/or calculations may be performed for the requested aggregates at the enterprise database 110 itself. Moreover, only the data requested to be displayed might be transmitted to the application server 150 or even directly to a User Interface ("UI"). For example, FIG. 2 is a block diagram of a system 200 according to some embodiments of the present invention. The system includes an enterprise database 210 storing actual business data 220. The enterprise database 210 may be associated with a database server process, cache, and/or datastore.

The enterprise database 210 may communicate with one or more database applications (not shown in FIG. 2) over one or more interfaces (e.g., a Structured Query Language ("SQL")-based interface). The database applications may provide, for example, business reporting, inventory control, online shopping, and/or any other suitable functions. The database applications may, in turn, might support client applications that may be executed by client devices. Such a client application may simply comprise a Web browser to access and display reports generated by a database application.

The data of the enterprise database 210 may be received from disparate hardware and software systems, some of which are not inter-operational with one another. The systems may comprise, for example, a back-end data environment employed in a business or industrial context. The data may be pushed to the enterprise database 210 and/or provided in response to queries received therefrom.

Although embodiments are described with respect to the enterprise database 210, embodiments may also be implemented within one or more nodes of a distributed database, each of which comprises an executing process, a cache and/or a datastore. The data stored in the datastores of each node, taken together, may represent the full database, and the database server processes of each node operate to transparently provide the data of the full database to the aforementioned database applications. The enterprise database 210 may also or alternatively support multi-tenancy by providing multiple logical database systems which are programmatically isolated from one another.

The enterprise database 210 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein. Note that any of the embodiments described herein might be implemented with an in-memory enterprise database or any other type of database.

A database server process may receive requests for data (e.g., SQL requests from a database application), may retrieve the requested data from the actual business data 220 or from a cache, and may return the requested data to the requestor. In some embodiments, a database server process may include an SQL manager to process received SQL statements and a data access manager to manage access to stored data.

The enterprise database 210 may comprise and/or may be implemented by computer-executable program code. For example, the enterprise database 210 may comprise one or more hardware devices, including at least one processor to execute program code so as to cause the one or more hardware devices to provide a database server process. The enterprise database 210 may also include configuration files defining properties of the system (e.g., a size and physical location of each data volume, a maximum number of data volumes in a datastore, etc.). Moreover, the enterprise database 210 may typically include system files, database parameters, paths, user information and any other suitable information, including metadata describing the database objects that are stored therein. The actual business data 220 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or Random Access Memory (RAM).

Figure 3:
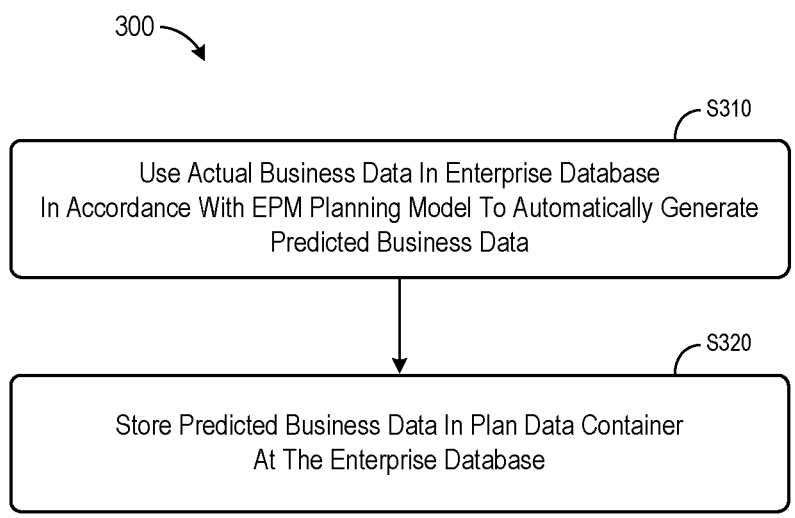
FIG. 3 is a flow diagram of a method in accordance with some embodiments described herein.

According to some embodiments, the enterprise database 210 includes an Enterprise Performance Management ("EPM") planning model 230 that describes how to access the actual business data 220. Note that the EPM planning model 230 may be executed at runtime where data can be accessed and manipulated. The EPM planning model 230 may be, for example, similar to programming code that instructs the runtime (at which time the runtime is executing on these instructions). The EPM planning model 230 may use the actual business data 220 to generate predicted values that may be stored at an instantiation of a plan data container 240 at the enterprise database 210. In particular, FIG. 3 is a flow diagram of a method 300 in accordance with some embodiments described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, actual business data in an enterprise database may be used in accordance with an EPM planning model, stored by a processor at an enterprise database, to automatically generate predicted business data. The EPM planning model might, for example, comprise a business simulation.

At S320, the predicted business data may be stored, by the processor, in an instantiation of a plan data container at the enterprise database. According to some embodiments, a plurality of users may share the actual business data in the enterprise database. In this case, each user may be associated with a different instantiations of the plan data container. Moreover, according to some embodiments, a single user may be associated with a plurality of instantiations of the plan data container. For example, a single user might store a pessimistic prediction in a first instantiation of the plan data container and an optimistic prediction in a second instantiation of the plan data container. Note that, as used herein, the phrase "plan data container" may refer to any abstraction of a container that operates as described herein. It may be instantiated for each user, and a single user might decide to create multiple instantiations to capture different simulations and/or predictions.

Figure 4:
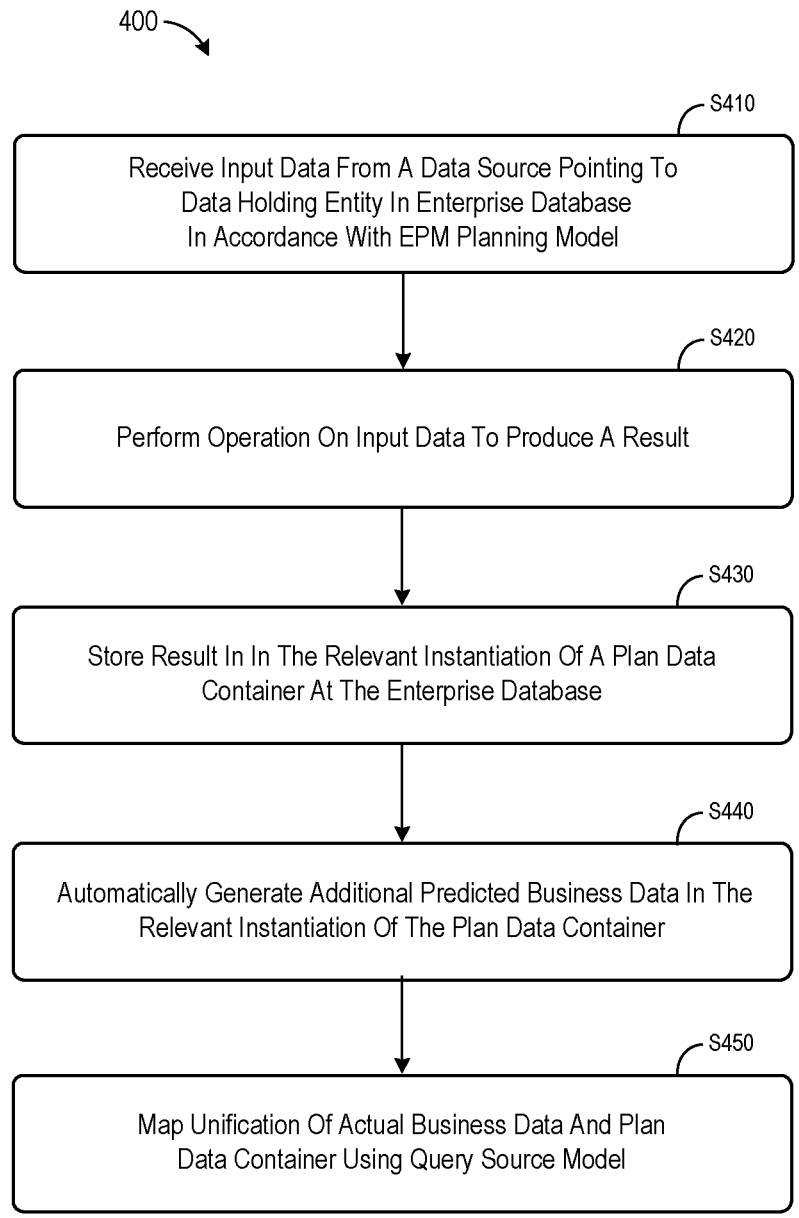
FIG. 4 is a flow diagram of a method in accordance with some embodiments described herein.

For example, FIG. 4 is a flow diagram of a method 400 in accordance with some embodiments described herein. At S410, input data may be received from a data source pointing to a data holding entity in an enterprise database in accordance with an EPM planning model. An operation may then be performed on the input data at S420 to produce a result. At S430, the result may be stored in a data target pointing to a data holding entity in an instantiations of a plan data container at the enterprise database. Additional predicted business data in the relevant instantiations of the plan data container may also be automatically generated at S440. According to some embodiments, changed data in a plan data container are performed by operations (such as in S420) which are orchestrated in algorithms which are orchestrated in actions. As described with respect to FIG. 9, a query source model may map the unification of the actual business data and plan data container at S450. The runtime provides a user-specific resolution (instantiation) of the plan data container to provide for the unification of actual data with data from the instantiation of the plan data container.

Figure 5:
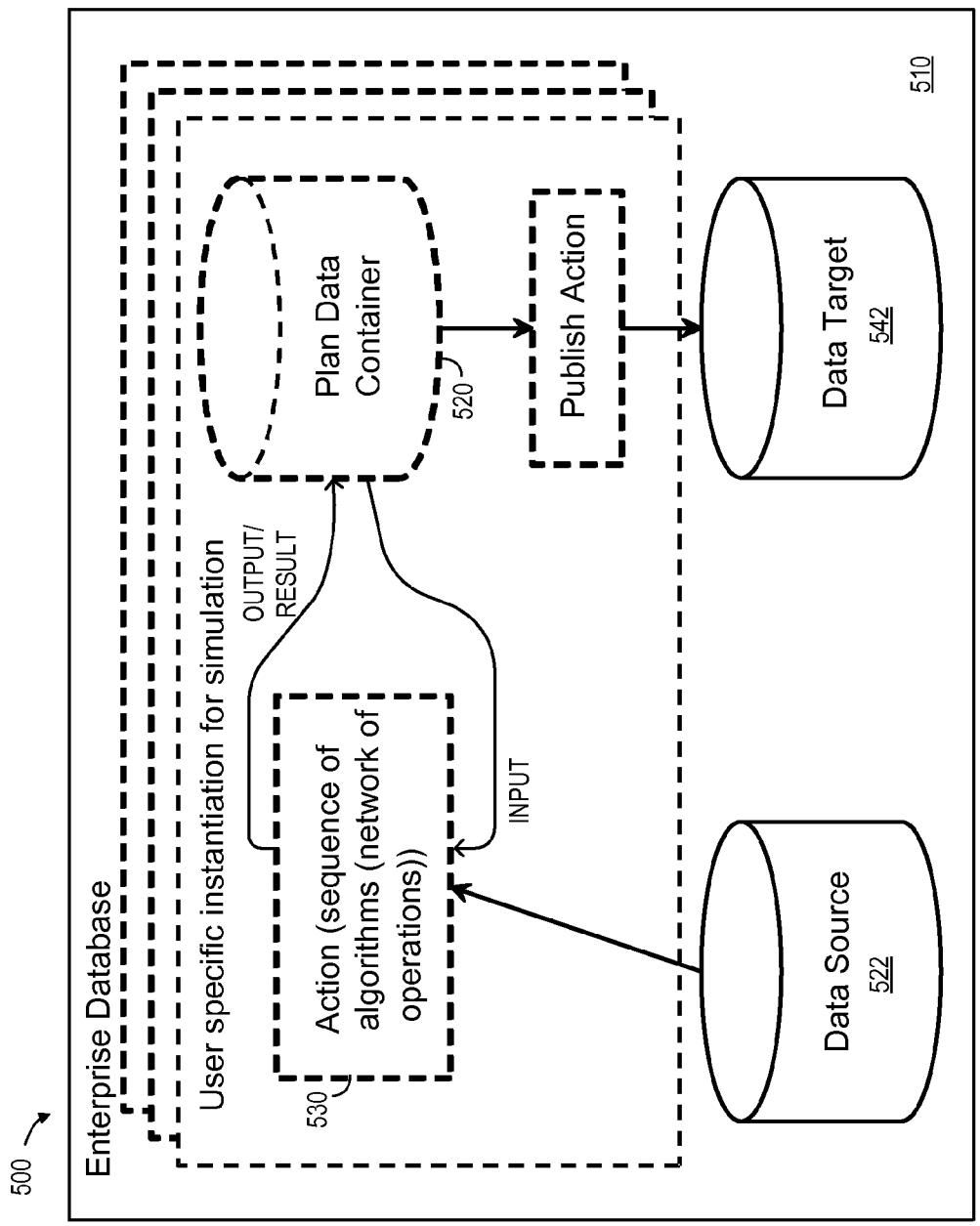
FIG. 5 is an example according to some embodiments.

Consider, for example, FIG. 5 which illustrates an example 500 where an enterprise database 510 having multiple, user-specific instantiations for simulation and a data source 522 (e.g., actual sales figures). An action 530 (e.g., a sequence of algorithms which may be a network of operations) may receive a value from the data source 522 as a data input and generate a result. The result may be, for example, a predicted business value that is stored into a data target 542 (e.g., predicted sales figures) via an instantiation of a plan data container 540 and a publish action. According to some embodiments, projection and filters may be captured in the parameterization of operations. Note that not every action might alter the data target 542. According to some embodiments, only "publish" operations alter the data target 542 while other operations may store a result in the instantiation of the plan data container 520. This may facilitate the "simulation" process associated with typical patterns of business planning (e.g., a planner might not want to publically persist changes performed while he or she is planning). Thus, instantiations of the plan data container 520 may comprise a fast, in-database store (which may be persisted) that keeps data in a private environment. Only the planner who created the data may be permitted to access the data (unless he or she decides to publish the data).

Figure 6:
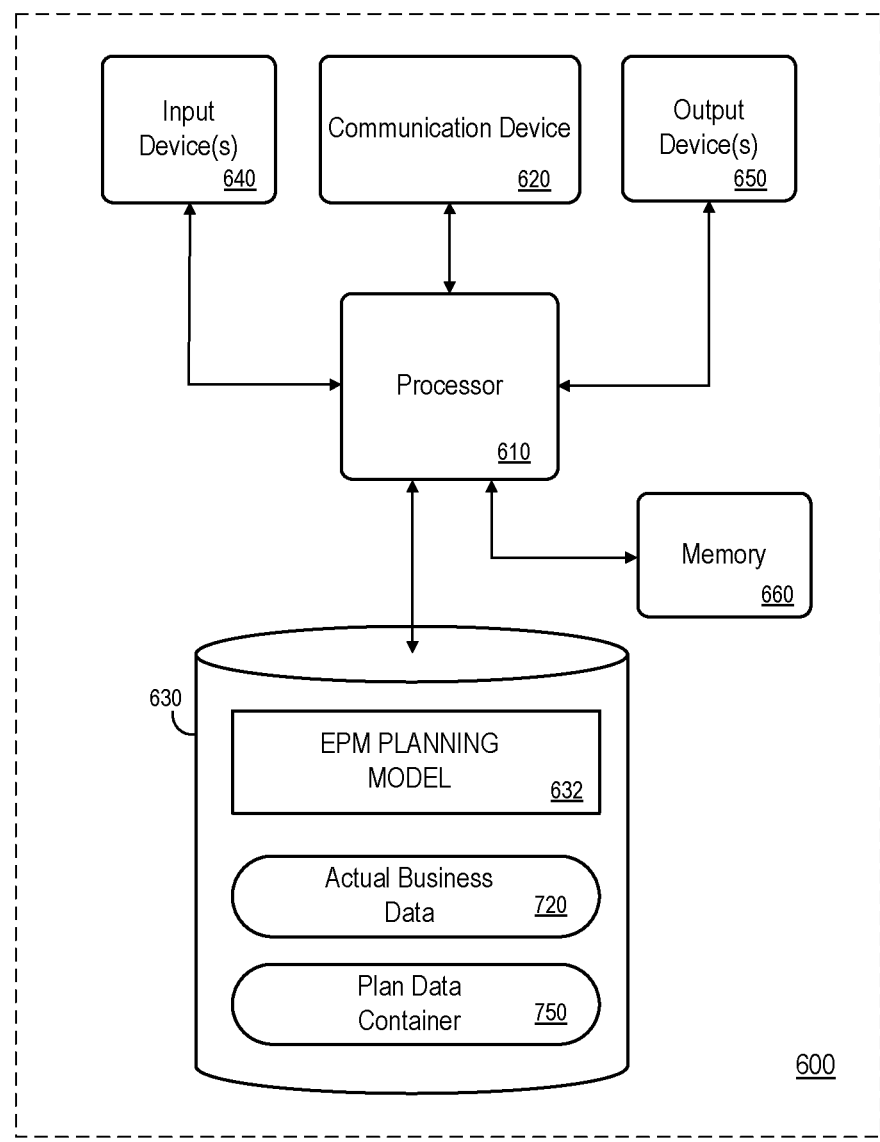
FIG. 6 is a block diagram of an apparatus in accordance with some embodiments.

FIG. 6 is a block diagram of an apparatus 600 according to some embodiments. The apparatus 600 may comprise a general-purpose computing apparatus and may execute program code to perform any of the functions described herein. The apparatus 600 may comprise an implementation of the enterprise database 210 of FIG. 2. The apparatus 600 may include other unshown elements according to some embodiments.

The apparatus 600 includes a processor 610 operatively coupled to a communication device 620, a data storage device 630, one or more input devices 640, one or more output devices 650 and a memory 660. The communication device 620 may facilitate communication with external devices, such as a reporting client, or a data storage device. The input device(s) 640 may comprise, for example, a keyboard, a keypad, a computer mouse or other pointing device, a microphone, knob or a switch, an infra-red (IR) port, a docking station, and/or a touch screen. The input device(s) 640 may be used, for example, to enter EPM planning data into apparatus 600. The output device(s) 650 may comprise, for example, a display (e.g., a display screen) a speaker, and/or a printer.

The data storage device 630 may comprise any appropriate persistent storage device, including combinations of magnetic storage devices (e.g., magnetic tape, hard disk drives and flash memory), optical storage devices, Read Only Memory (ROM) devices, etc., while the memory 660 may comprise Random Access Memory (RAM).

Program code associated with the EPM planning model 632 may be executed by a processor 610 to cause the apparatus 600 to perform any one or more of the processes described herein. Embodiments are not limited to execution of these processes by a single apparatus. According to some embodiments, data storage device 630 further includes persisted data such as columnar tables, delta structures and other data associated with a datastore, while the memory 660 may store columnar tables, delta structures and other data described above as being stored in a volatile memory. The data storage device 630 may also store data and other program code for providing additional functionality and/or which are necessary for operation thereof, such as device drivers, operating system files, etc.

Figure 7:
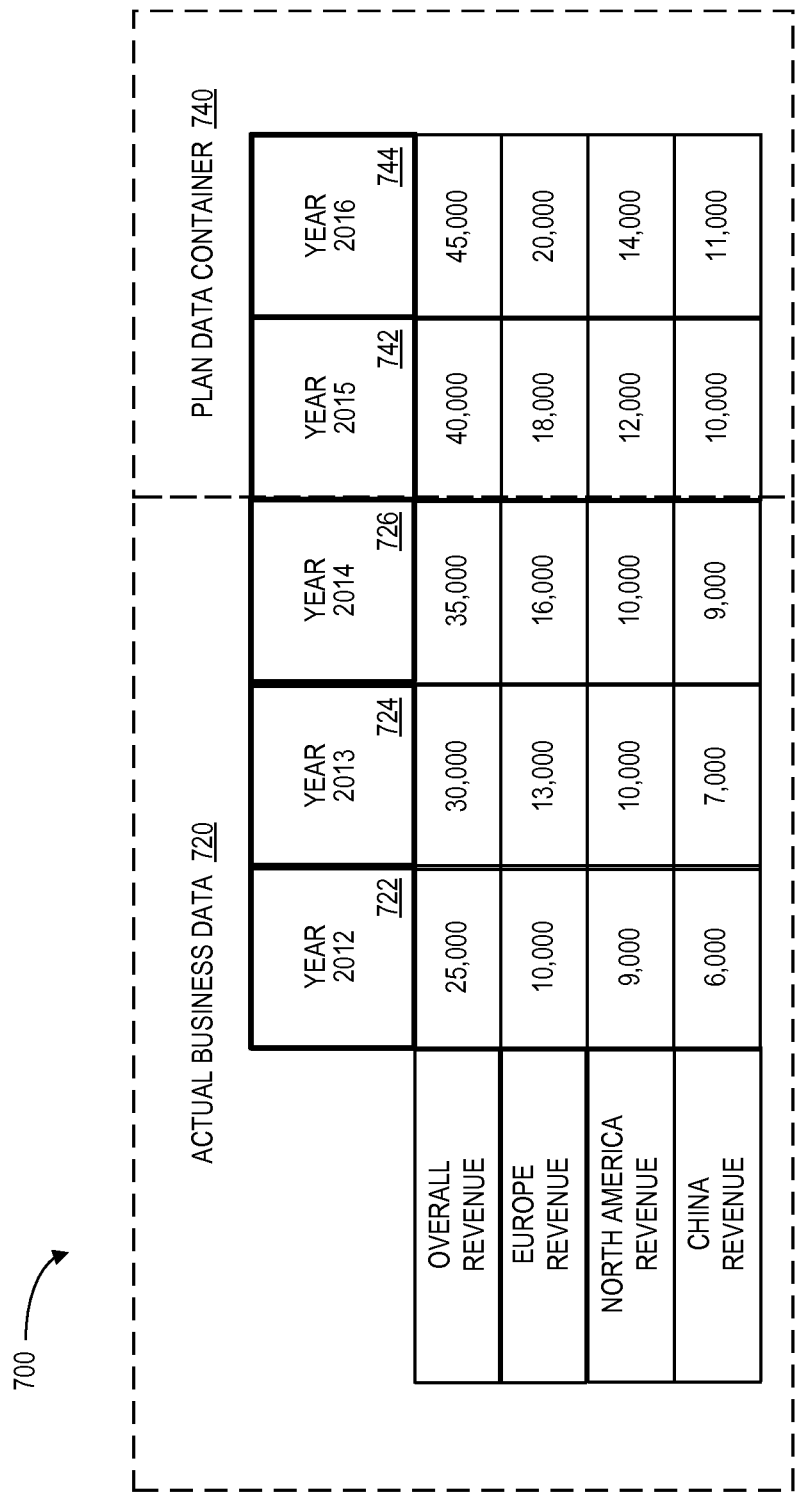
FIG. 7 is portion of a tabular representation of database information according to some embodiments.

FIG. 7 is portion of a tabular representation of database information 700 according to some embodiments. In particular, both actual business data 720 and plan data container 740 information is displayed. In the example of FIG. 7, business data for overall revenue, Europe revenue, North America revenue, and China revenue includes: actual revenue values 722, 724, 726 and predicted future revenue values 742, 744 in the plan data container 740. Note that all users may share actual business data 720 while different users may each be associated with different plan data containers 740.

Figure 8:
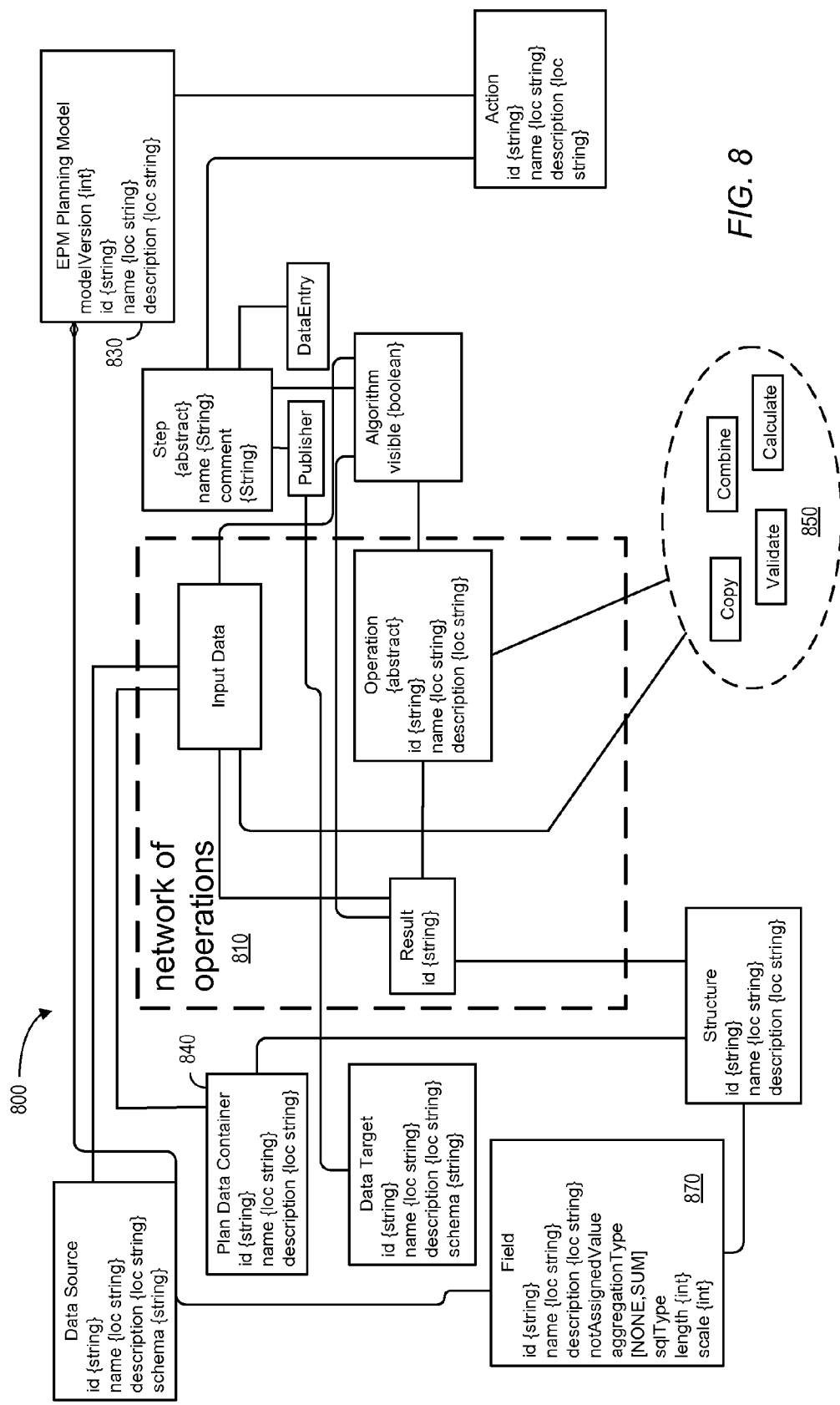
FIG. 8 illustrates a representation of an EPM planning model in accordance with some embodiments.

FIG. 8 illustrates a representation of an EPM planning model 800 that includes a network of operations 810 in accordance with some embodiments. Note that an inheritance relation between the superclass Input Data and its sub-classes "Result," "Data Source," and "Plan Data Container" may enable the network of operations. Further, one operation may use a data source as input and produce a result as an output which may in turn be an input to another operation, etc. In particular, the network of operations 810 includes input data, operations, and a result to be stored to a structure. The environment 800 includes an EPM planning model 830 and fields 870. Moreover, a data source may point to existing data holding entities in a database, such as cubes, analytic views, join views, calculation views, column table, etc. and the operations 850 may read data from these data sources. A data target may point to an existing data holding entity in the database (e.g., it may be writable and a "publisher" algorithm may write data from a plan data container 840 to the corresponding data target). Note that for clarity, not all containment relations are illustrated in FIG. 8. In general, all classes shown are contained in a container class that may be referred to as an EPM planning model. The set of classes described with respect to FIG. 8 may be considered an EPM planning "meta" model. Instances of these classes may be referred to as the EPM planning model. Such an EPM planning model may then be executed at runtime. At that point, the runtime may access and manipulate data as described in the EPM planning model. Note that EPM planning model may play a similar role as the query source model 950 of FIG. 9.

The plan data container 840 might comprise, for example, a simple table used to let different planners have different instances of predicted data. Moreover, the plan data container 840 may define a planning structure by referring to a structure which in turn lists a set of fields 870 which reflect dimensions and measures of business data. The plan data container 840 may be altered by algorithms which provide a result that is applied to the plan data container 840, which can also be used as "input data" for other operations. According to some embodiments, the plan data container 840 supports different kinds of persistency levels, such as "transient", "saved" and/or "published".

The operations 850 may operate on a structure, consume input data, and produce results. Note that a result may, according to some embodiments, be used as input data such that a plan designer can stitch together a data flow graph of operations. Examples of operations 850 may include calculate, copy, combine, script, and/or lookup. If no appropriate operation 850 is available to express a desired operation, SQL Script (with planning extensions) might be used to code the operation. This may be considered as a planning specific programming language ("Exit").

The result of an operation may be expressed as entities of an object. Input data may be associated with an abstract class representing all types of input data for an operation 850. For example, concrete classes of input data may include "plan data container", "data source" and "result". According to some embodiments, a parameter may replace any sub-class of data. In this sense, a parameter is so to say a configuration of the respective data object which is deferred from design time to runtime. The type definition may help the infrastructure decide if the model is correct. At runtime all parameter definitions associated with an action may be retrieved and provided with values by the client.

A planning algorithm may interface with the plan data container 840 via a query view. Moreover, the planning algorithm may execute operations 850 (e.g., copy, combine, etc.) such as a single activity that may or may not change the data in the plan data container 840. The planning algorithm may point to one result of one operation 850 that operates on a structure by consuming input data and producing a result. Note that a result may, according to some embodiments, be used as input data such that a plan designer can stitch together a data flow graph of operations 850. According to some embodiments, a single operation 850 is an instance of one specific operation offered by the EPM planning model. During instantiation, the interface of the specific operation 850 may need to be satisfied. This might be done explicitly or by defining a parameter which may stand in for missing values.

As used herein, an "action" may express all data changing activities that can be triggered by a user and/or the EPM planning model 830. Note that such a user interaction may require multiple planning activities, which may be represented by a sequence of algorithms. According to some embodiments, a single algorithm alters the data of one specific plan data container 840 and an action lists multiple algorithms (e.g., an action may act across multiple plan data containers 840).

Note that the field 870 may be associated with characteristics (which in turn may be associated with characteristic relationships and/or a hierarchy via a master data container) and/or key-figures. According to some embodiments, the field 870 comprises a representation of a field (column/element) in the context of planning and a data type and size can be either defined explicitly or by pointing to column in a data source. According to some embodiments multiple fields 870 may be combined into a structure that can be used is used to define a structure of the plan data container 840, a result and/or an "operation."

Figure 9:
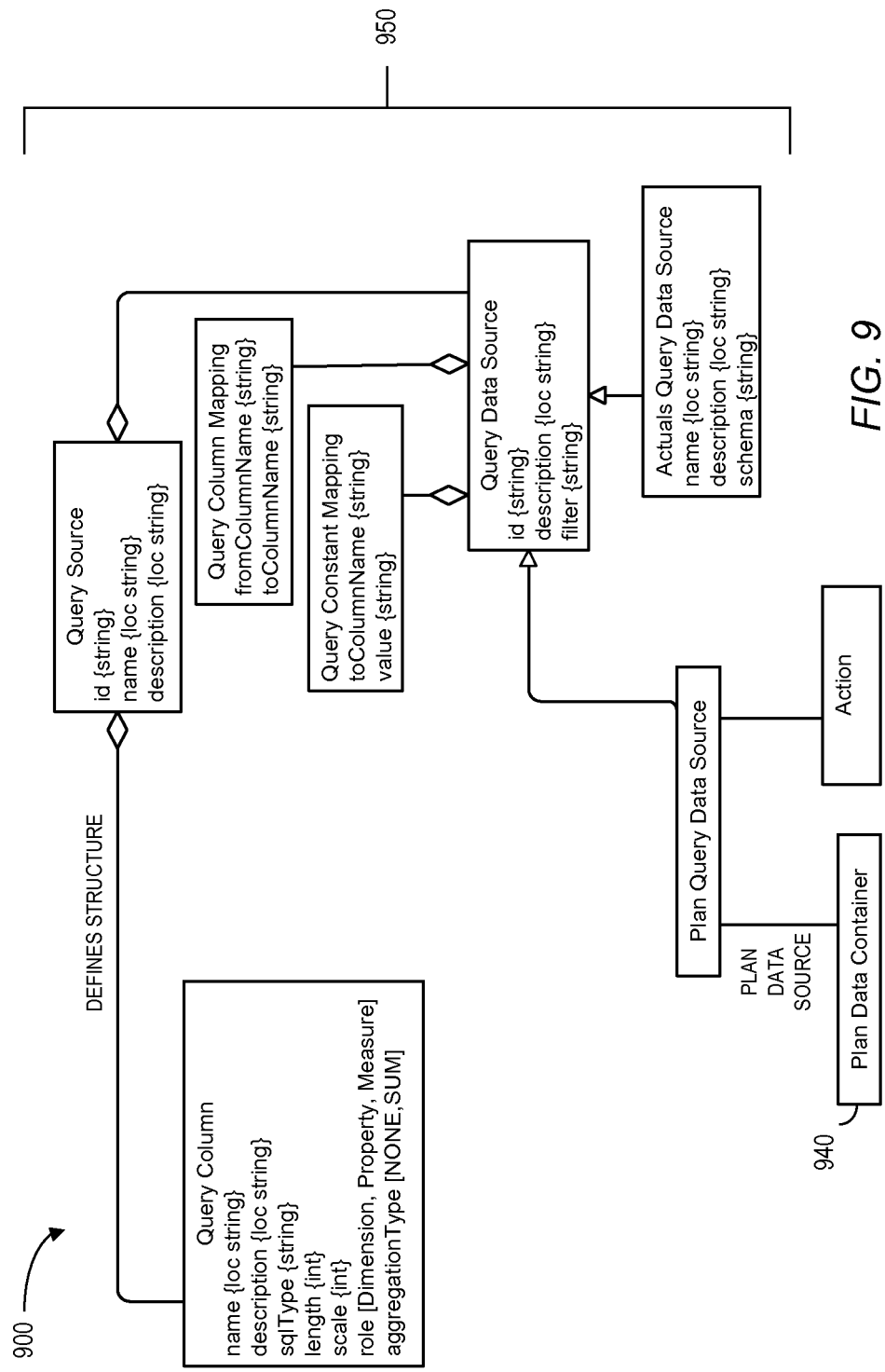
FIG. 9 represents a query source model according to some embodiments.

FIG. 9 illustrates a system 900 including a plan data container 940 interacting with a query source model 950 according to some embodiments. Note that in typical planning use cases, a user may want to compare plan (predicted) and actual data. As described herein, the plan data container 940 may be the abstract modeling concept that holds the plan data in a user specific version (simulation). As the plan data container 940 is an abstract concept, it cannot directly be queried. An EPM platform may provide a (user specific) resolution from the plan data container to a real existing storage area. The query source model 950 may serve two purposes in this regard (similar to the EPM planning model 830 of FIG. 8): (i) it may resolve the plan data container 940 to a real storage at runtime, and (ii) it may define the how the plan and actual data should be unified. A query source may be an abstract data source that can be consumed by a planning UI. It may define how the actual data and plan data will be used and how they should be unified. The unification may be, for example, supported with mappings. As used herein, a "query source" might refer to exactly one EPM planning model (but to multiple plan data containers within this EPM planning model).

Moreover, a query column and query data source may consist of multiple query data sources which might be either plan and/or actual data. Actual data might be modeled by specifying the name of an existing database entity or view. Plan data may be specified by pointing to a plan data container of an existing EPM planning model. It may also point to one (or more) actions defined in the same EPM planning model. Those actions may, for example, be used to enter data. Thus, only those actions may be used in a plan query data Source which provide a data entry algorithm for the plan data container 940 it points to.

Figure 10:
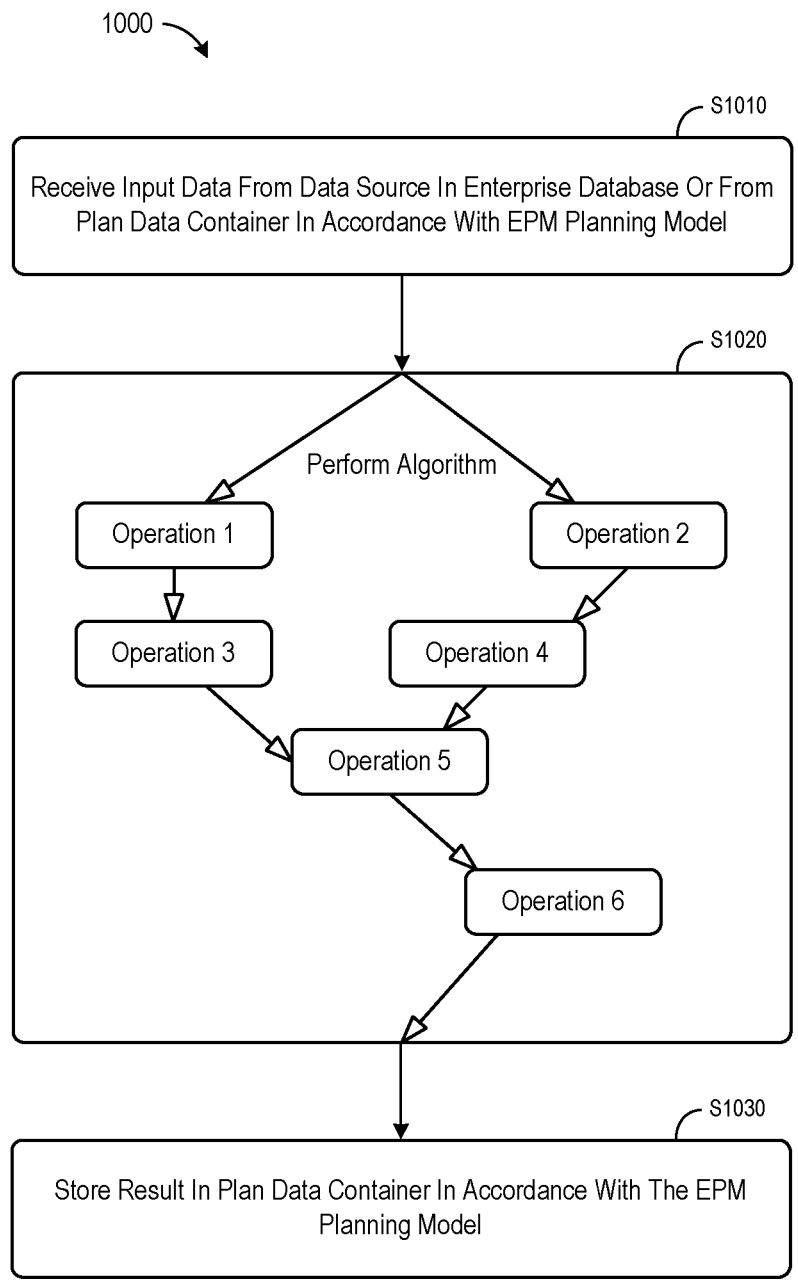
FIG. 10 is a flow diagram of a planning operation method in accordance with some embodiments described herein.

According to some embodiments, an EPM planning model may use one or more operations to describe typical actions that might be performed by a planner. These operations may represent data manipulation algorithms specific for business planning. The operations may be built into an enterprise database and be used via SQL (e.g., an SQL extension). FIG. 10 is a flow diagram of a planning operation method in accordance with some embodiments described herein. At S1010, input data may be received from a data source in an enterprise database or from plan data container in accordance with an EPM planning model. The EPM planning model may be, for example, stored by a processor at the enterprise database. As used herein the phrase "data source" might be associated with, for example, an On-Line Analytical Processing ("OLAP") view, an analytic view, a calc view, tables (e.g., row store and column store), and/or attributes views. At S1020, an algorithm may be performed. The algorithm may be associated with a plurality of "operations," each of which may use input data to produce a result. As used herein, the term "operation" may refer to, for example, a data manipulation algorithm associated with business planning (some examples of operations are described in connection with FIGS. 11 through 21). Note that an operation may take one or more results of another operation or operations as input. This makes the "network of operations" described herein. At S1030, the result may be stored in a plan data container in accordance with the EPM planning model.

Figure 11:
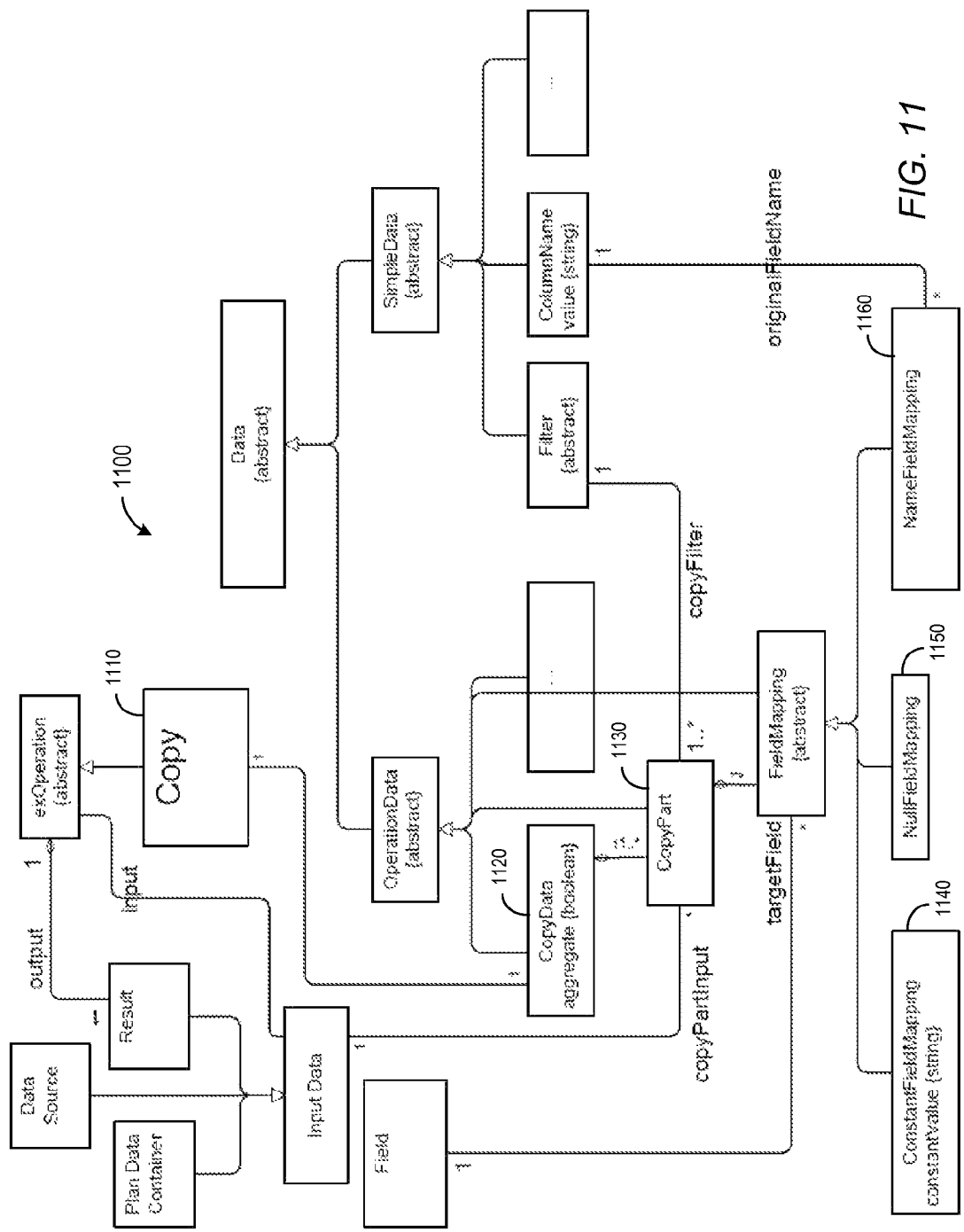
FIG. 11 illustrates a copy operation structure in accordance with some embodiments.

Several types of operations will now be described. Note, however, that embodiments described herein may be used with respect any other EPM type of operation or action. FIG. 11 illustrates a "copy" operation structure 1100 in accordance with some embodiments. The copy operation 1110 may be used to provide data from different input data into one target. According to some embodiments, a general flag may define if the data should be aggregated or not aggregated by the copy operation 1110.

Typically, one copy part might be defined per input source, such that a copy part refers to an input data (source) and optionally a filter. If the input data had a filter defined already (e.g., when it is a data source), the two filters may be combined using an AND operator. For each copy part, one or more copy mappings may be defined. The copy operation 1110 may be repeated for every mapping that is defined.

According to some embodiments, CopyData 1120 may reference multiple InputData, and all InputData that are used in any CopyPart 1130. The CopyData 1120 may include a "yes/no" aggregation flag and contains 1 . . . n CopyPart 1130. The CopyPart 1130 may be associated with a CopyPartInput and reference to exactly one InputData. The CopyPart 1130 may be associated with a CopyFilter filterexpression and contain 1 . . . n CopyMapping or FieldMapping.

A ConstantFieldMapping 1140 may define a constant value for the (new) target field and be associated with a TargetField reference to one target field and a ConstantValue string. A NullFieldMapping 1150 may define a (new) target field to be set to NULL and be associated with a TargetField reference to one target field. A NameFieldMapping 1160 may define a (new) target field mapped to a different original field and be associated with a TargetField reference to one target field and an OriginalFieldName reference to a column name.

Note that, according to some embodiments, a source field can be mapped to multiple target fields. Moreover, for every CopyPart 1130 all target fields may need to be explicitly mapped with either ConstantFieldMapping 1140, a NullFieldMapping 1150 or a NameFieldMapping 1160. Even for identical names, a NameFieldMapping 1160 may be needed (in the design time model to avoid exposing any implicit behavior at design time).

By way of example, consider a first table:

| Dim2 | MeaA |
|---|---|
| a | 7 |
| b | 9 | a second table:

| Dim3 | Dim2 | MeaB |
|---|---|---|
| a | x | 1000 |
| b | x | 2000 |
| c | x | 3000 |
| a | y | 4000 | and a target structure:

| Dim3 | Dim2 | MeaA | MeaB |
|---|---|---|---|

According to some embodiments, the target structure may be filled from both the first table and the second table. In this case, the instances of CopyPart 1130 referring to the tables may specify how the missing fields are handled. For example, CopyPart1 might indicate that:

input taken from the first table,

ValueMapping for Dim3 with value "x," and

ValueMapping for MeaB with value 0.

and CopyPart2 might indicate that:

input is to be taken from the second table, and

ValueMapping for MeaA with value "0."

In this example, the following target structure will result from the copy operation 1110 when the aggregation flag is "false":

| Dim3 | Dim2 | MeaA | MeaB |
|---|---|---|---|
| a | x | 7 | 0 |
| b | x | 9 | 0 |
| a | x | 0 | 1000 |
| b | x | 0 | 2000 |
| c | x | 0 | 3000 |
| a | y | 0 | 4000 |

Moreover, the following target structure would result from the copy operation 1110 when the aggregation flag is "true":

| Dim3 | Dim2 | MeaA | MeaB |
|---|---|---|---|
| a | x | 7 | 1000 |
| b | x | 9 | 2000 |
| c | x | 0 | 3000 |
| a | y | 0 | 4000 |

Note that a CopyFilter may be applied on the input data source.

Figure 12:
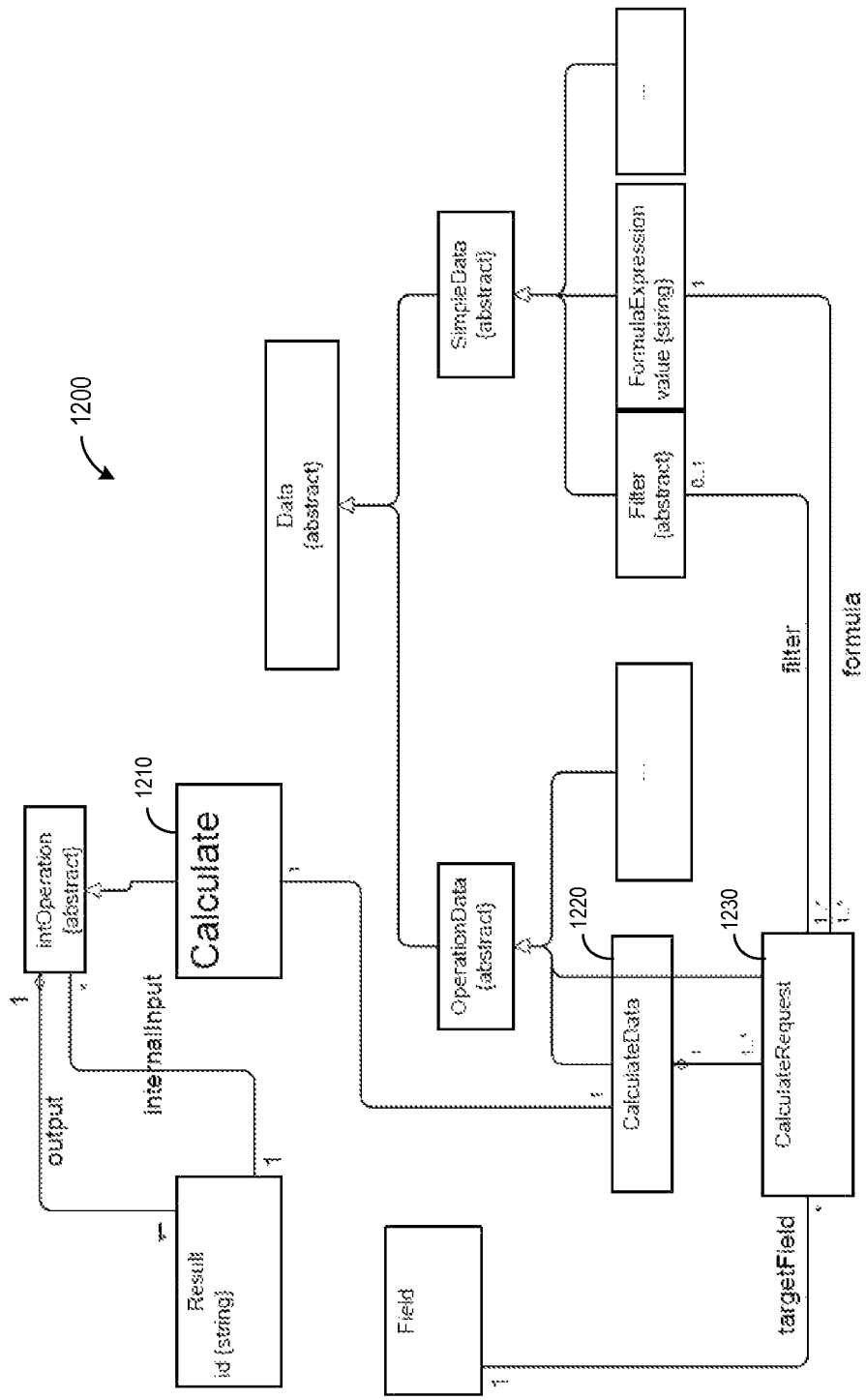
FIG. 12 illustrates a calculate operation structure in accordance with some embodiments.

FIG. 12 illustrates a "calculate" operation structure 1200 in accordance with some embodiments. A calculate operation 1210 may be used to apply simple formula expressions to a target column. For example, a simple expression might comprise a constant value, such as minus one ("-1"). A CalculateData 1220 may contain 1 . . . n CalculateRequests 1230. Each CalculateRequest 1230 may be associated with a filter, a formula (FormulaExpression), and a reference to a target field (TargetField). Note that a FormulaExpression may use operators and/or functions. Moreover, values can be used from other fields in the same row and any field can be a target of a CalculateRequest (independent of aggregation behavior). Further note that a target field might typically only occur in one CalculateRequest. Multiple occurrences, however, may be permitted according to some embodiments.

Figure 13A:
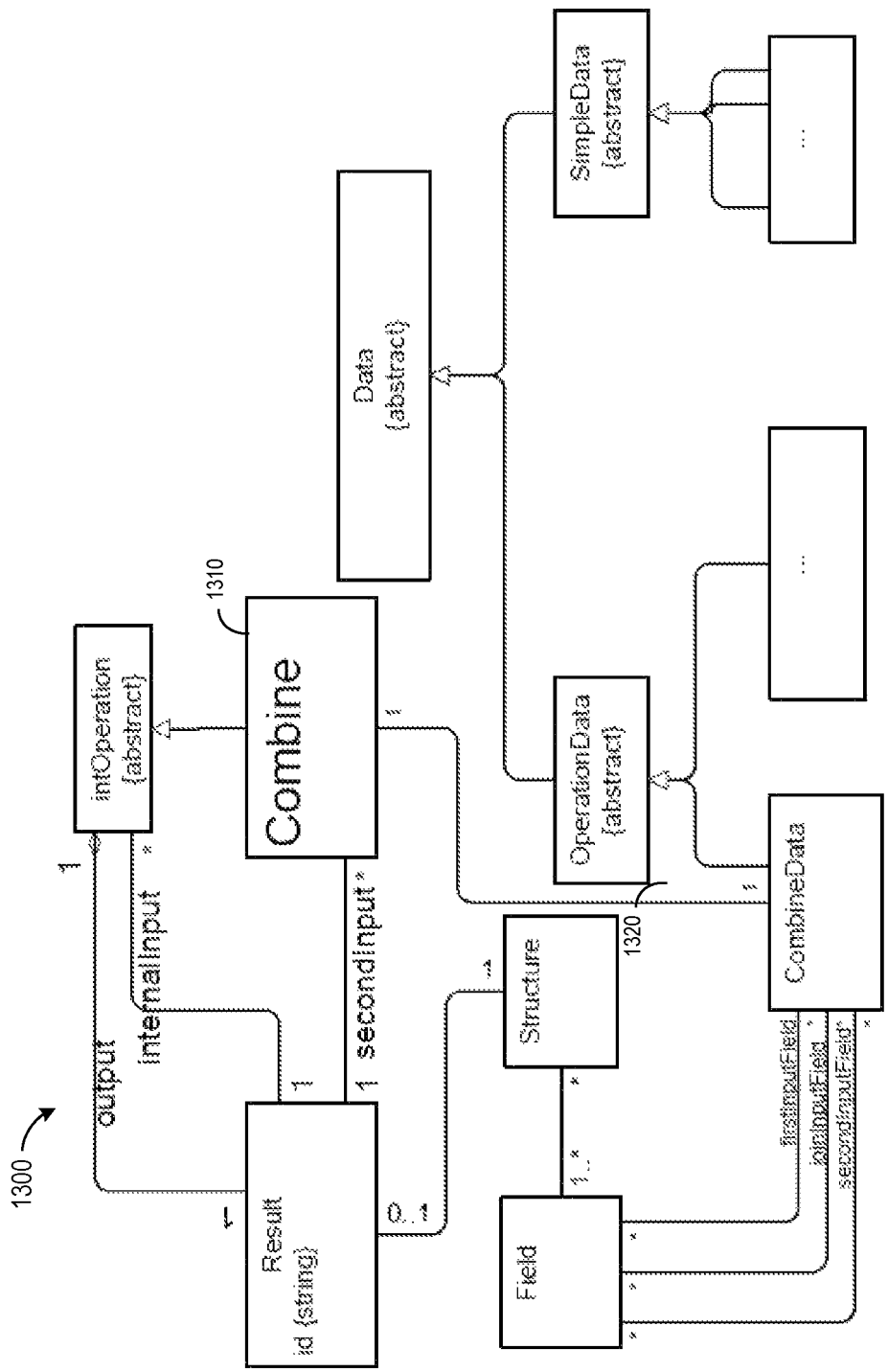
FIG. 13A illustrates a combine operation structure in accordance with some embodiments.
Figure 13B:
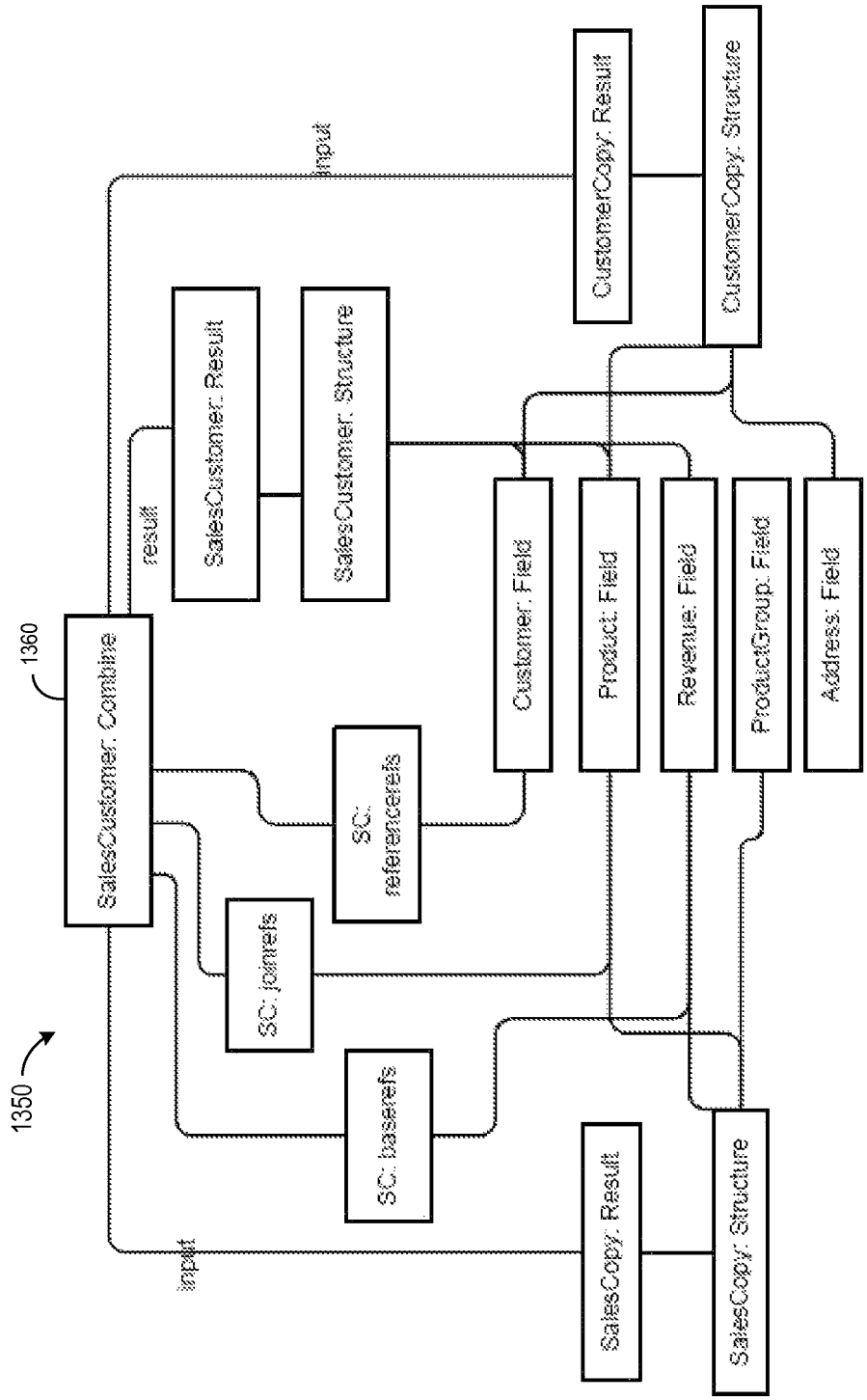
FIG. 13B is an example instance diagram of a combine operation according to some embodiments

FIG. 13A illustrates a "combine" operation structure 1300 in accordance with some embodiments. A combine operation 1310 may express a join, such as an inner join and/or a cross join. Note that all fields of the resulting structure might appear in exactly one of the CombineData 1320 field lists (FirstInputField, JoinInputField, or SecondInputField). Note that the join fields may need to be identical (same instances of object field) in all three structures (two inputs and one output). When additional renames are desired, a copy operation may be used first. The FirstInputField(s) may indicate the additional fields taken from the first input. The SecondInputField(s) may indicate the additional fields taken from the second input. When the JoinInputField(s) list is empty, a cross join may be performed. Otherwise, an inner join is applied. When no JoinInputField is specified, at least one FirstInputField and one SecondInputField might be required. When at least one JoinInputField is given, both other field lists may be permitted to be empty. Also note that fields are considered equal in the sense of the join operation only when they are represented by the same (identical) instance of the field objects. FIG. 13B is an example instance diagram 1350 of a combine operation according to some embodiments. In this example, a SalesCustomer combine operation 1360 is associated with a customer copy result and sales copy result.

Figure 14:
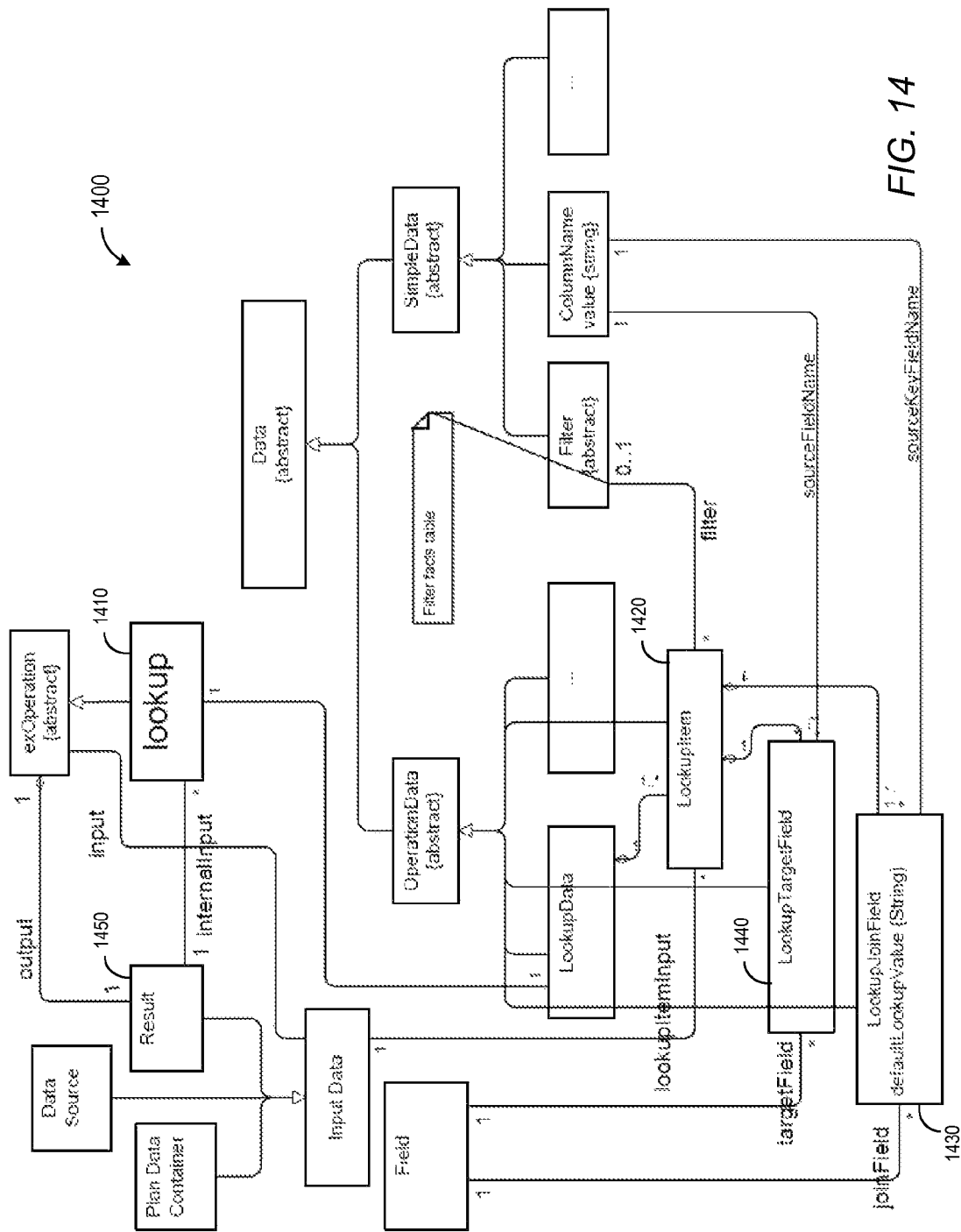
FIG. 14 illustrates a lookup operation structure in accordance with some embodiments.

FIG. 14 illustrates a "lookup" operation structure 1400 in accordance with some embodiments. A lookup operation 1410 may be used to retrieve additional data related to data already available inside the EPM managed data. This might refer to, for example, data already present in a result. The lookup operation 1410 may behave similar to a join, but does not alter the number of rows. Instead, the lookup operation 1410 keeps track of whether or not a lookup result (join partner) was found for the respective line in the input (result 1450). This information can then be used for error handling or subsequent lookup steps.

According to some embodiments, the lookup operation 1410 may express multiple lookup steps (quasi joins) in one operation. Lookup items may be used to define these single steps. When different lookup items affect the same target field, the execution of the different items may be serialized and subsequent steps may only take care of those rows that did not yet receive a lookup value (join partner). A default lookup value may be defined and used to search the join partner if the given key is not found.

The lookup operation 1410 may require exactly one internalInput of type result 1450 to hold data that requires additional information to be looked up in (potentially different) input data. In the typical use cases, this internal input will be a facts table. Moreover, a lookup operation 1410 can have one or more LookupItems 1420 which define the "quasi" join operation. Each LookupItem 1420 may contain one or more JoinFields 1430 and one or more TargetFields 1440. The set of JoinFields 1430 may define the key to be used for the lookup in the input data. In typical use cases, the input data will be a master data or a rules table. Note that when the key values from the internalInput table are not found in the input data, a second lookup for data may be made with the defaultLookupValue. The set of TargetFields 1440 may define which column values are to be transferred from the input data (via sourceFieldName) to the result 1450 (via the reference to a target field).

Figure 15:
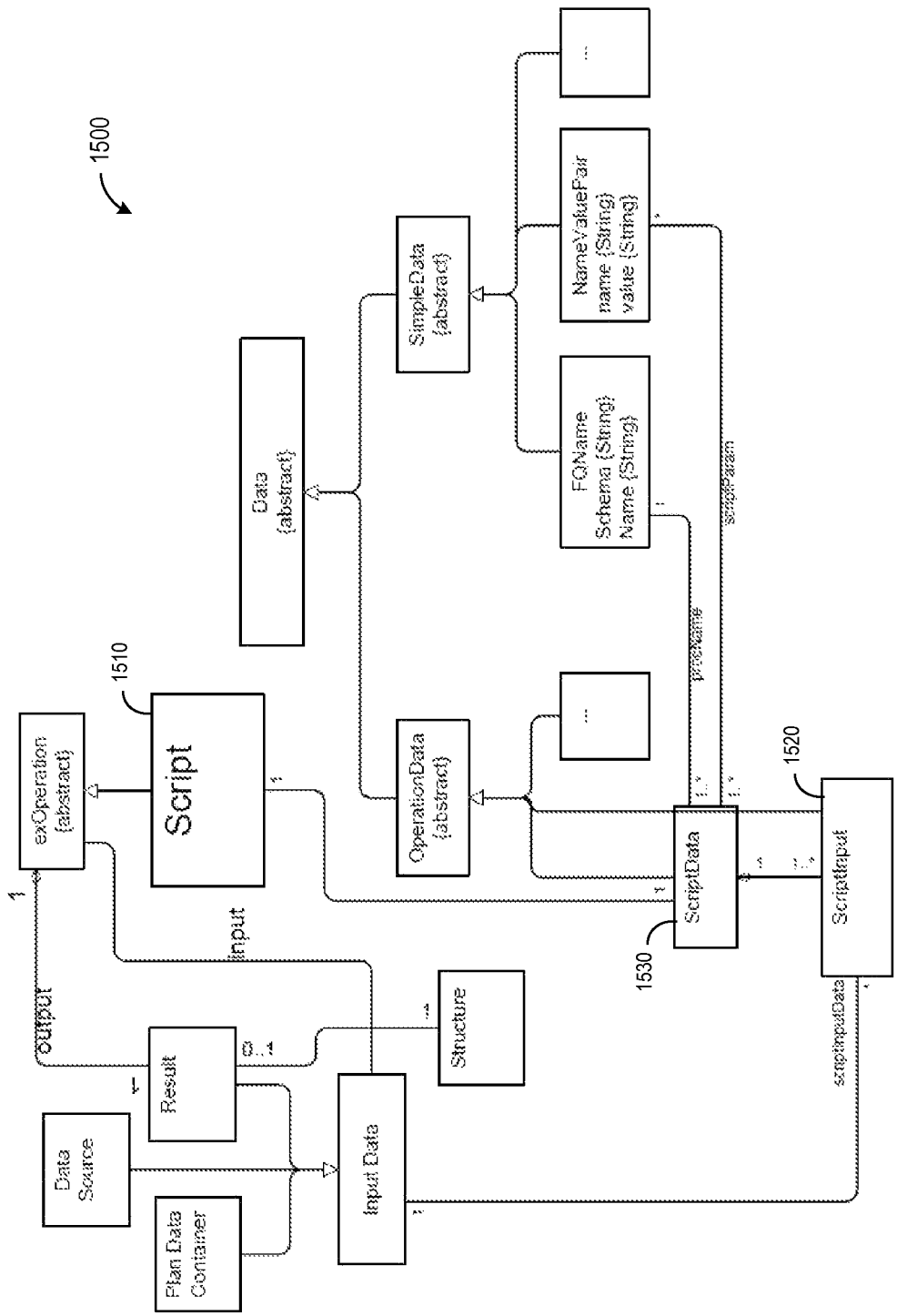
FIG. 15 illustrates a script operation structure in accordance with some embodiments.

The result 1450 may represent the facts that need additional information provided by the lookup operation 1410. Note that while the lookup operation 1410 is similar to a join, the inner and left outer join may change the number of lines. The lookup operation 1410, in contrast, keeps the number of lines constant. The lookup operation also adds error handling to join operation and allows multiple lookups in one operation. The LookupItem 1420 may comprise a masterdata table and all field names (sourceFieldName and sourceKeyFieldName) may need to appear in this input data. Since this does not necessarily have a structure in the EPM mode, the field names may be used. Moreover, Lookup items may be serialized in runtime if they affect identical target fields. Subsequent lookup items will then only take care of the rows that were not covered by previous lookup items. The LookupTargetField 1440 may define the lookup behavior as read from source and write to target field. The set of LookupJoinFields 1430 may define the key to be used for the lookup from the master data table. Note that the defaultLookupValue may be used to look up data when the real key value is not found FIG. 15 illustrates a "script" operation structure 1500 in accordance with some embodiments. The script operation 1510 may be associated with a ScriptInput 1520 and ScriptData 1530.

Figure 16:
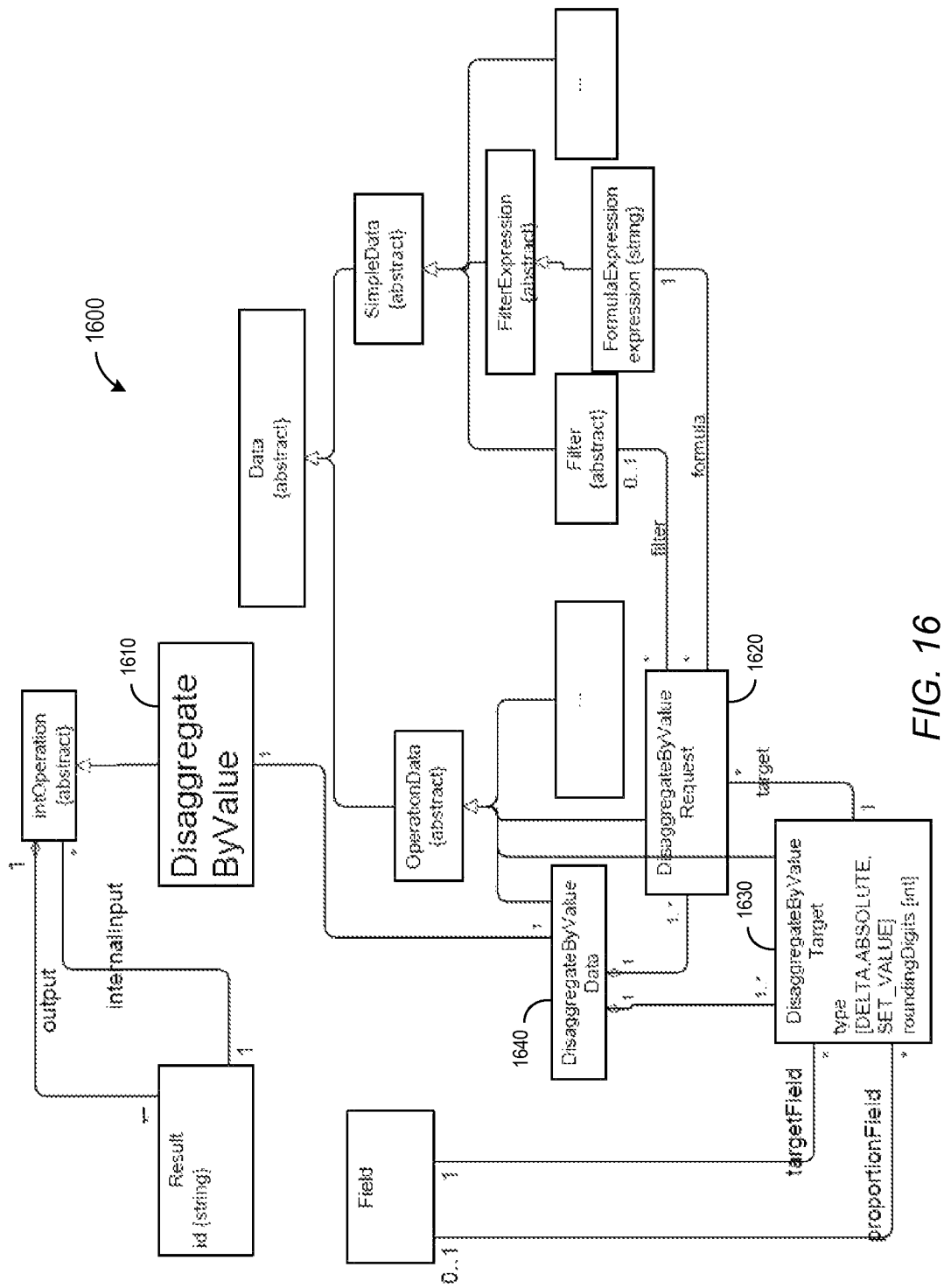
FIG. 16 illustrates a disaggregate-by-value operation structure in accordance with some embodiments.

In some cases, a planner might want to "disaggregate" information to separate (something) into its component parts. For example, a planner might define a worldwide profit and want a model to assume that 30% of that value is associated with Europe, 30% is associated with North and South America and 40% of the profit value is associated with Asia. FIG. 16 illustrates a "disaggregate by value" operation structure 1600 in accordance with some embodiments. The disaggregate by value operation 1610 may comprise the typical operation used to write back data from an input enabled grid to the plan data containers. Every number that is changed by the user on the grid may be transferred to the backend enclosed in a request 1620. Usually, targets 1630 will be defined at design time, but the requests 1620 holding the formula (often a value), filter and target reference will be determined by the user input.

According to some embodiments, a request 1620 may refer to a target 1630 that defines which field is affected and whether or not a field (potentially the same field for self-reference) will be used to define the proportions to be used during disaggregation. If not proportion field is defined, the data will be distributed equally. As opposed to the DisaggregateByReference operation described with respect to FIG. 17, the rows and cells that will get the dis-aggregated data must already exist when the disaggregate by value operation 1610 is started.

The DisaggregateByValueTarget 1630 may include a targetField to store the resulting values of a dis-aggregation request. The DisaggregateByValueTarget 1630 may also include a proportionField to define the proportions to be used when dis-aggregating a value down to the detailed level. When not present, an equal dis-aggregation method may be applied. According to some embodiments, roundingDigits may define the rounding precision to be applied during the dis-aggregation operation—for this specific target. If not present, the precision may be selected based on the dimensions of the targetField.

The DisaggregateByValueRequest 1620 may be associated with a filter that define the area that may be affected by the dis-aggregation request, a formula that define the total value to be disaggregated, and/or a target that refers to a target definition.

Note that the order of requests 1620 may be important. Consider, for example, two requests for dis-aggregation: A first request sets the total revenue for a product group to $1000345, and a second request sets the revenue for one product in this product group to $345. In this example, the request for the single product should be processed first. It will set the value to $345 as desired and then fixes it so that the request to disaggregate $1000345 for the product group will not alter the value for the single product.

According to some embodiments, DisaggregateByValueData 1640 may require additional objects at runtime, such as a DisaggregateFilter and a DisaggregateRequest. The latter, for example, may combine a Target and a Filter with the value to be disaggregated. Data might be disaggregated with equal distribution mode if no reference field is specified.

Figure 17:
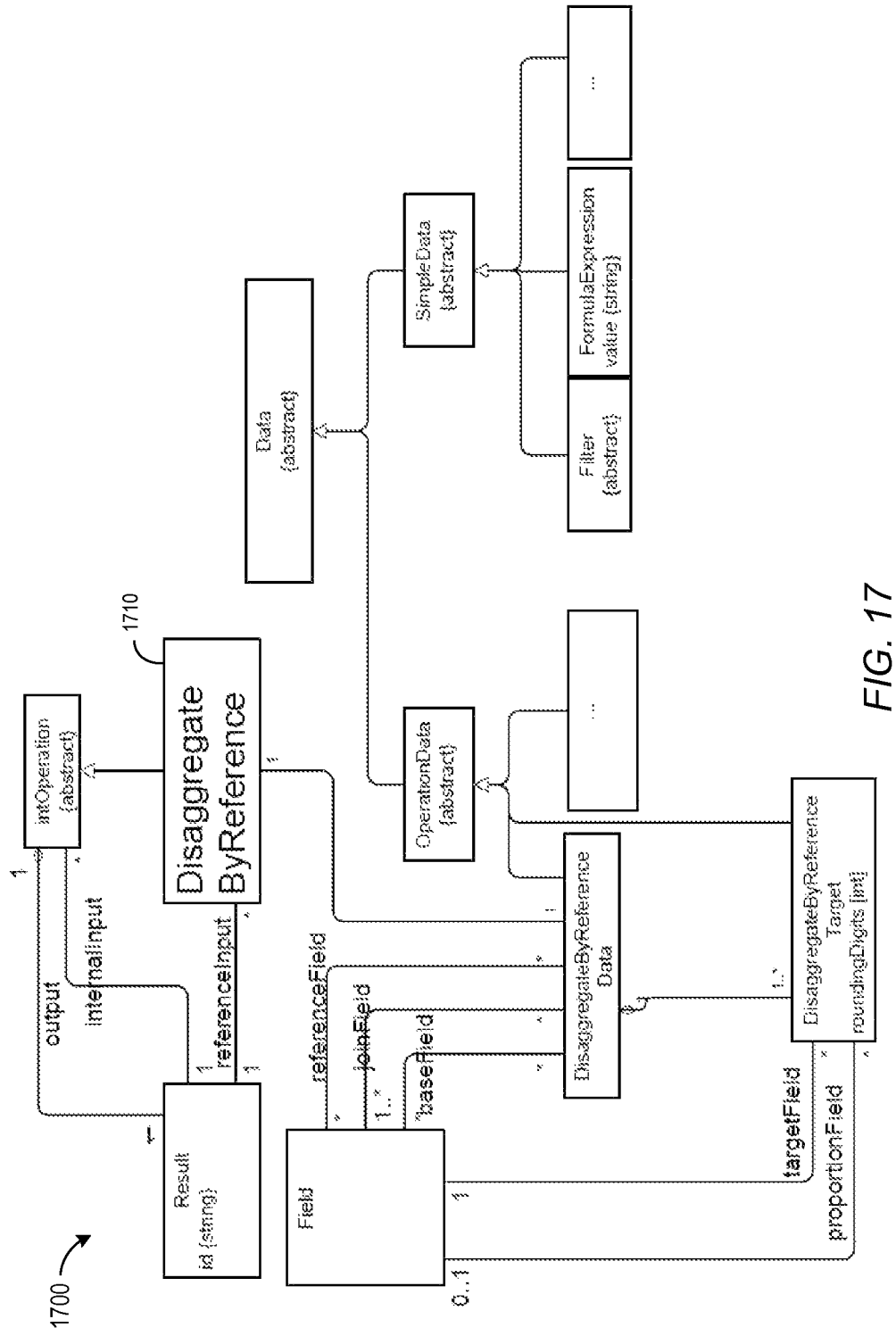
FIG. 17 illustrates a disaggregate by reference operation structure in accordance with some embodiments.

FIG. 17 illustrates a "disaggregate by reference" operation structure 1700 in accordance with some embodiments. The disaggregate by reference operation 1710 may include at least one joinField because otherwise no matching reference can be found for the given base data. Moreover, at least one referenceField may be provided along with any number of baseFields and a single targetField. One or no proportionField may be provided to determine the weights of the disaggregation. If no proportionField is given, the figure may be disaggregated with equal weight.

Figure 18:
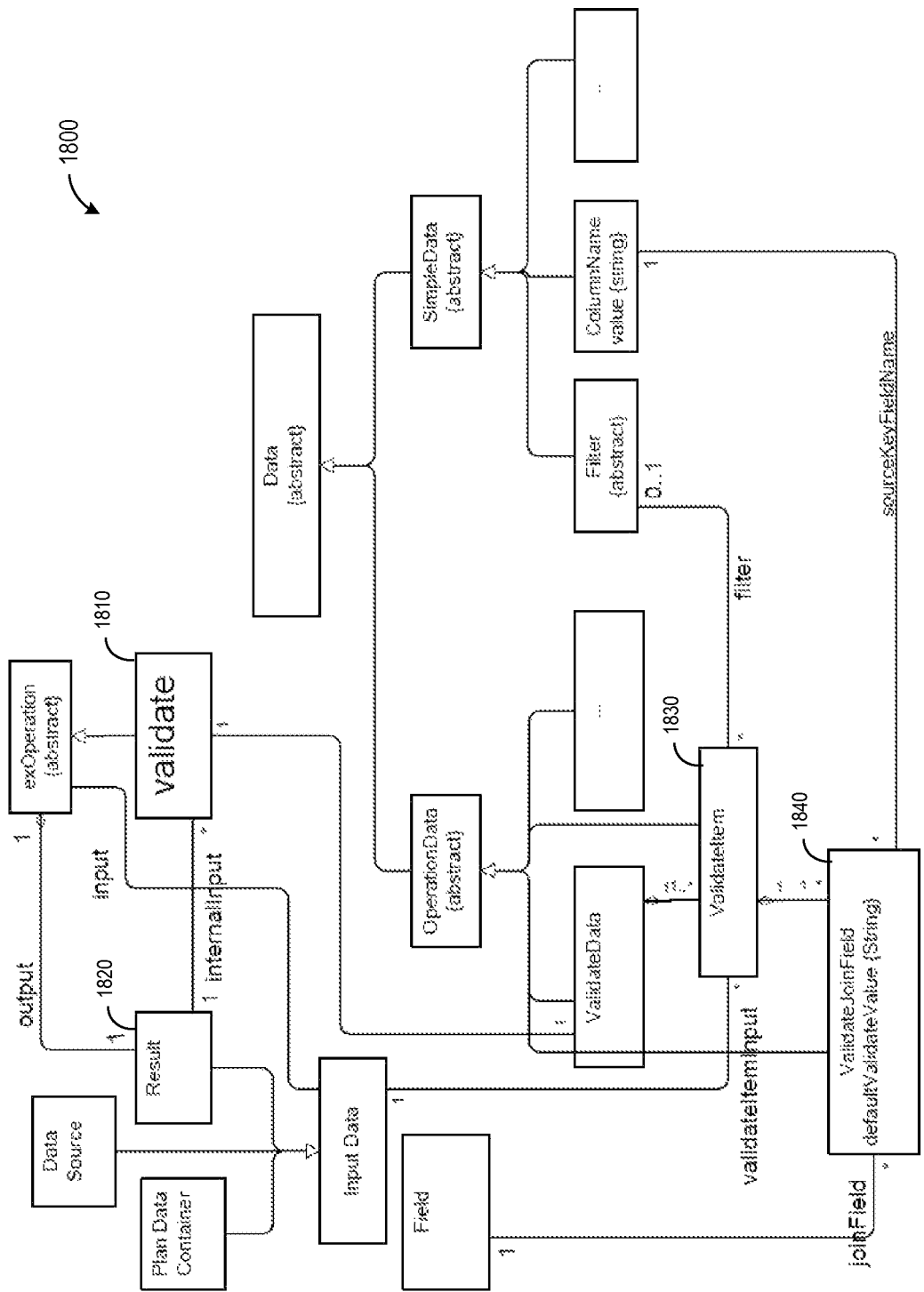
FIG. 18 illustrates a validate operation structure in accordance with some embodiments.

FIG. 18 illustrates a "validate" operation structure 1800 in accordance with some embodiments. The validate operation 1810 may include a result 1820 containing the facts that need to be validated. A ValidatedItem 1830 may comprise a masterdata table and all field names (sourceFieldName and sourceKeyFieldName) may need to appear in this input data. Since this does not necessarily have a structure in the EPM model, the field names may be used. The ValidateItems 1830 may be serialized in runtime if they affect identical target fields. Subsequent ValidateItems may then only take care of the rows not covered by previous ValidateItems 1830. A set of ValidateJoinFields 1840 may define the key used to validate from the master data table. A defaultValidateValue may be used to validate data when the real key value is not found.

Figure 19:
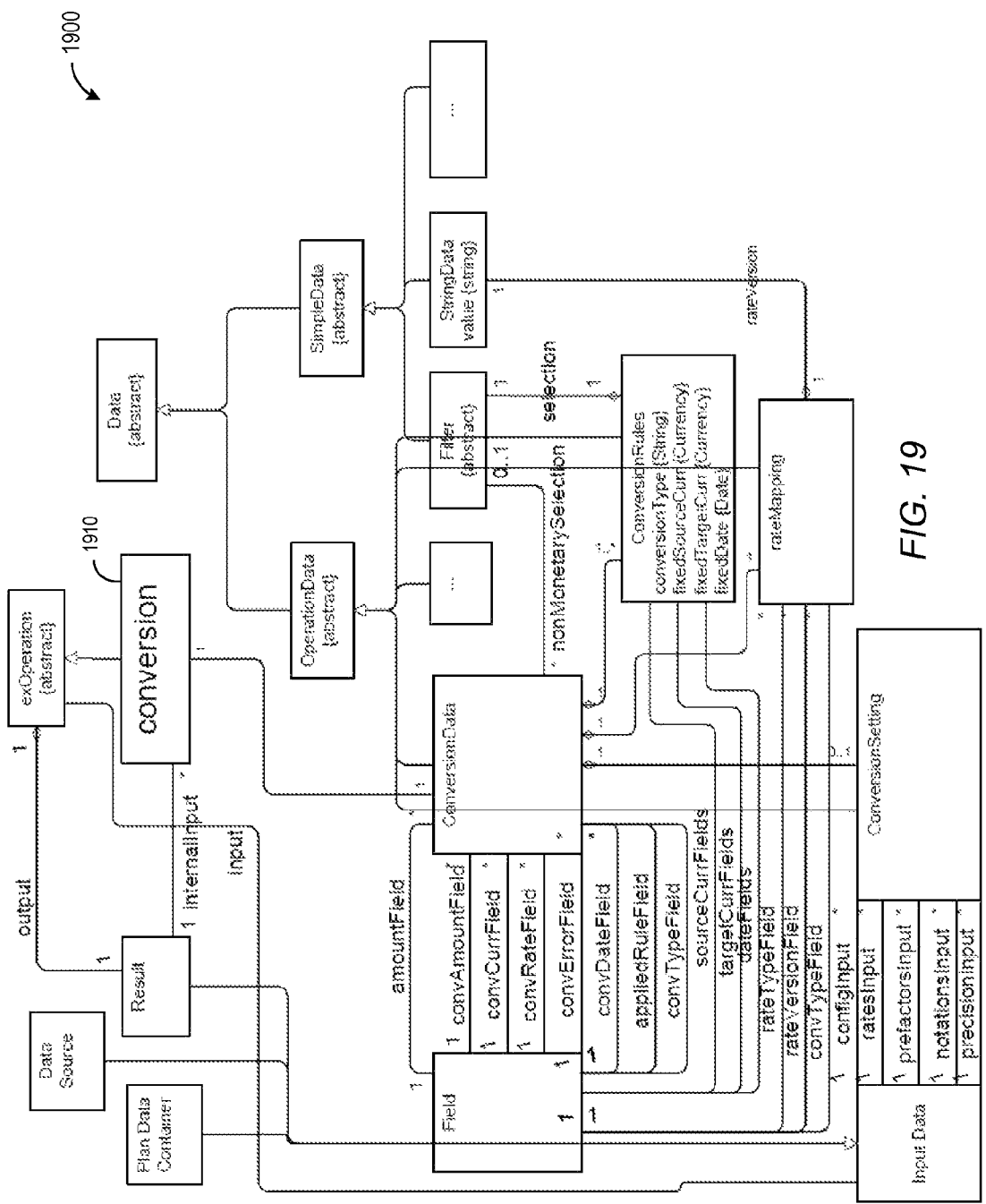
FIG. 19 illustrates a conversion operation structure in accordance with some embodiments.

A multi-country enterprise may store monetary values associated with a number of different currencies. Moreover, the relationship between these currencies can vary over time. FIG. 19 illustrates a currency "conversion" operation structure 1900 in accordance with some embodiments. The conversion operation 1910 may have input data coming from different sources (planning data, ERP data, third party data, etc.) to be translated from local currencies to a single consolidation currency. Note that format of these input tables may be different. For example, the data may be more aggregated in planning and third party tables as compared to the ERP (the ERP may have a more detailed account hierarchy) and there may be more columns in the ERP. For example, there might always be a date associated with the data in the ERP so it may be possible to use "spot rate" currency conversion, whereas in planning and third party tables there may be no date, and "average rate" currency conversion may be used instead.

The currency translation may be based on type of rates defined for a free set selection of data, such as category/account, category/account/flow, category/account/entity or any other dimensions. According some embodiments, profit and loss accounts may be translated with a spot rate for ERP data and an average rate for planning data. In some cases, an opening conversion rate or closing rate may be used for a transaction that occurs on a given day. According to some embodiments, a version of rate is a dedicated dimension to help manage flexible rate simulation on actual and budget data. The rate model may be, for example, defined in the masterdata and each financial model may be associated to a rate model. The currency translation rule(s) may be associated to a model via a task sequence that is executed on the fly as an EPM add-in by the end user. A planner may be able to define on the fly both a consolidation currency and a version of rate and a period of rate (or an overridden rate).

Figure 20:
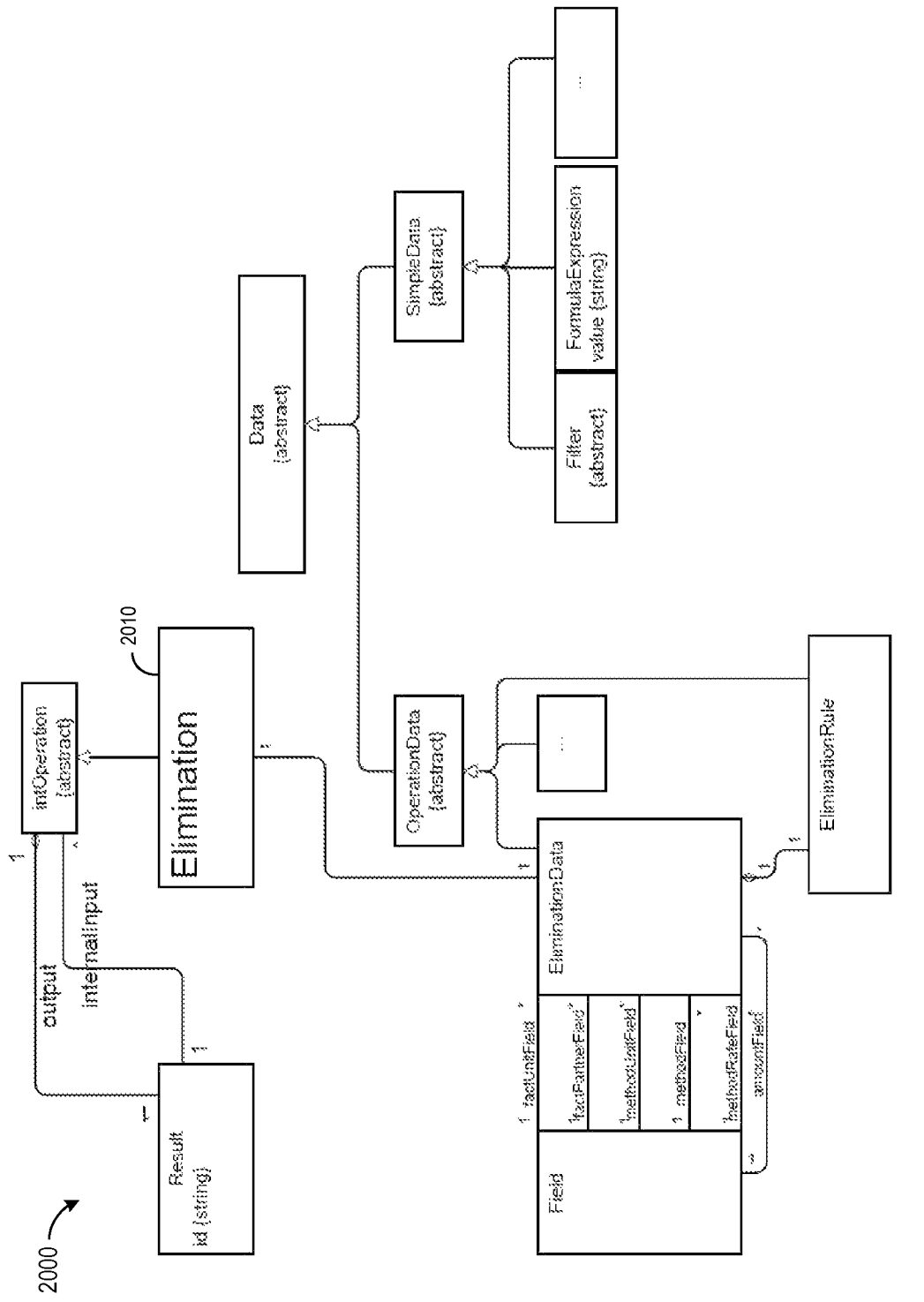
FIG. 20 illustrates an elimination operation structure in accordance with some embodiments.

In some cases, an enterprise may be associated with a hierarchy of accounts. For example, a global enterprise may own a European company, a North American company, and an Asian company. Moreover, these accounts may own equity and or execute transactions with each other. As a result, duplicate values can occur when figures are consolidated. FIG. 20 illustrates an "elimination" operation structure 2000 in accordance with some embodiments. The elimination operation 2010 may be used to reflect the exact financial situation of a holding when consolidating figures (its own and the ones of its subsidiaries). When one company is the parent company of a subsidiary company, a consolidated financial statement may provide an overall picture of the companies' combined financial position. When two or more companies have affiliated transaction entries, the elimination operation 2010 may help avoid redundant documentation of stock ownership of a subsidiary company by stockholders, inter-company debt, inter-company revenue and expenses, etc.

For example, companies within a group may sell one another goods or services, pay rent or loan interest to one another, and/or perform any other transactions that are in reality a transfer of assets. In such cases, the parent company's financial statement may shows a note receivable as an asset, while the subsidiary company shows a note payable as a liability. When combined, an elimination entry created by the elimination operation 2010 may remove both since what has essentially occurred is just a cash transfer within the group (or the holding).

There are several calculation methods that may be implemented regarding these situations. For example, a full integration method may integrally consolidate the subsidiaries' financial figures in the holding balance sheet (assets and liabilities) and profit and loss chart. An equity method may substitute, in the holding balance sheet, to the subsidiaries' share book value held by the mother company, the corresponding part in the equity capital (including profit). A proportional consolidation method may substitute, in the holding profit and loss chart, the quote part of the assets and liabilities of the subsidiaries, held by the mother company. The profit and loss quote part may be added to the holding profit and loss. The conditions of the application of these methods may be defined by the planner.

According to some embodiments, an automatic adjustment may be performed before the elimination operation 2010. For example, in order to eliminate two amounts (one receivable for an entity and its payable counter-part for another entity belonging to the same holding), those two amounts may need to be equal. The automatic adjustment may compare amounts of a selection (including a payable account, for example) and its counter-selection (including receivable accounts, for example) to have them equal by adding a new entry that represents the difference between those two amounts. There are several methods that may be used to calculate this difference. For example, a higher amount method may compare, in absolute value, the lower total amount to the higher total amount and add a new entry related to the higher selection with difference as amount. A lower amount method may compare, in absolute value, the higher total amount to the lower total amount and add an new entry related to the lower selection amount with difference as amount. A selection method may compare the total amount of the counter-selection to the total amount of the selection and add a new entry related to the selection with the difference. A counter-selection method may compare the total amount of the selection to the total amount of the counter-selection and add a new entry related to the counter-selection with the difference as amount.

According to some embodiments, a hierarchy transformation may be linked to the elimination operation 2010. For example, once a value has been generated for elimination, a new entry may be created in a group hierarchy in order to create an "elimination" node. This node may, for example, may be the one that holds the value calculated by the elimination operation 2010. Consider for example, the following hierarchy of entities:

World
  Europe
    Entity A
    Entity B
  United States
    Entity C
    Entity D A result of the hierarchy transformation may be:
World
    Europe
        Entity A
        Entity B
        Elimination
    United States
        Entity C
        Entity D
        Elimination
    Elimination A new hierarchy level posting may then be created in an appropriate "elimination" node. Consider, for example, a transaction between entity A and entity C. According to some embodiments, a "first common ancestor" approach would post the value on the elimination node attached to "World" as it is the first common ancestor for A and C. A "direct parent" approach may be posted the value on the elimination node attached to "Europe" as it is the direct parent of the entity.

Figure 21:
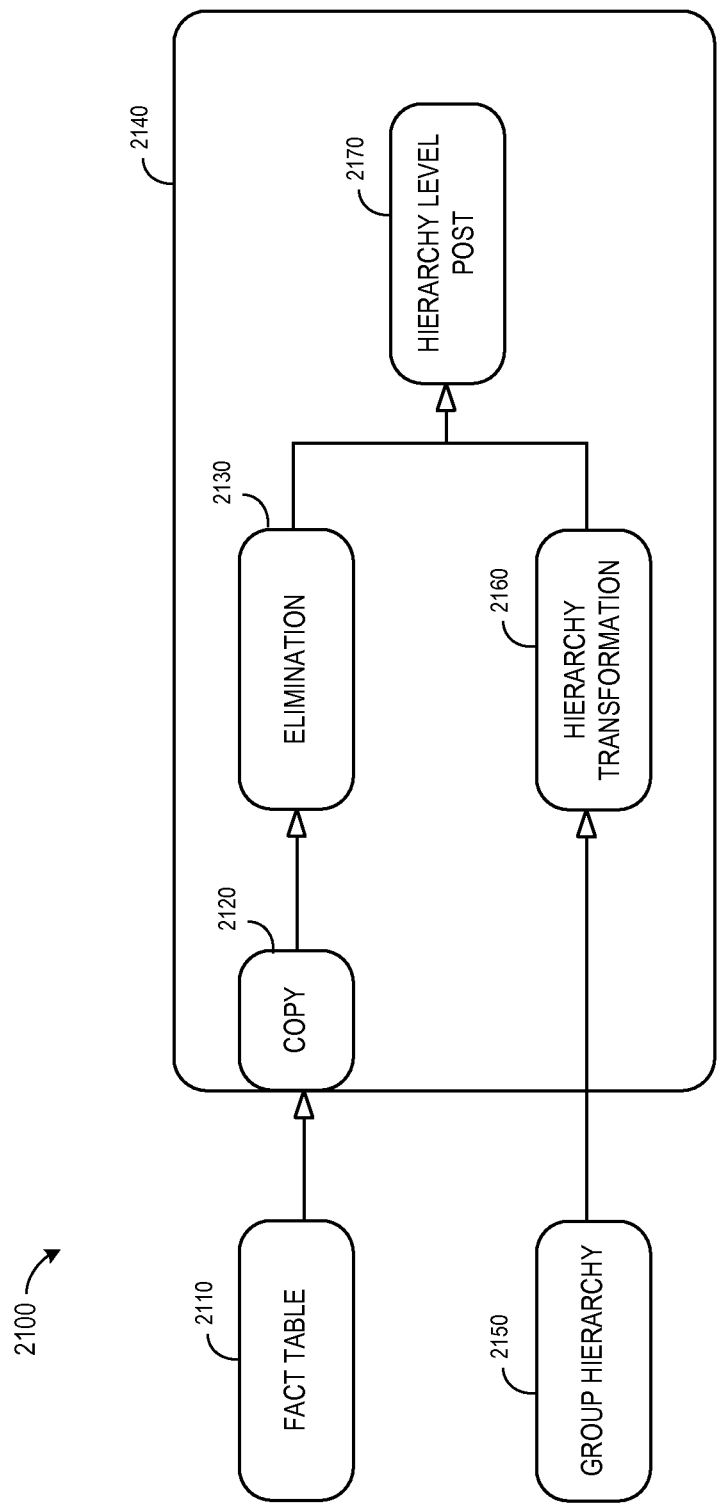
FIG. 21 is a dataflow example associated with the elimination operation.

Thus, the elimination operation 2010, hierarchy transformation, hierarchy level post may work together to facilitate planning. FIG. 21 is a dataflow 2100 example associated with the elimination operation 2010. In particular, information in a fact table 2110 may be copied 2120 to an instantiation of a plan data container 2140 and be subject to an elimination operation 2130. Moreover, group hierarchy information 2150 may be used to execute a hierarchy transformation 2160. The result of the elimination operation 2130 and hierarchy transformation 2160 may be used to create an appropriate hierarchy level post 2170.

Figure 22:
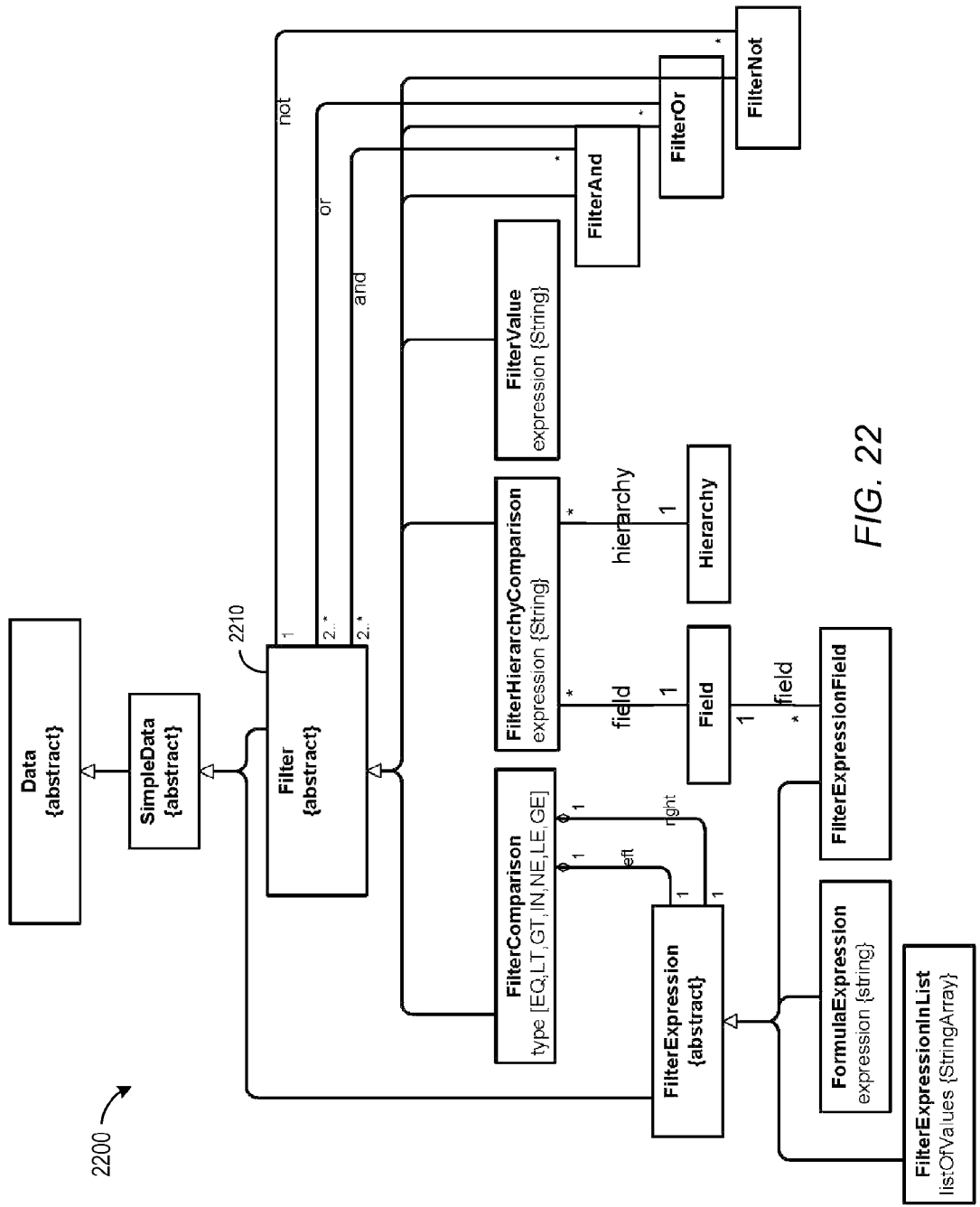
FIG. 22 illustrates a filter modeling structure in accordance with some embodiments.

FIG. 22 illustrates a "filter" modeling structure 2200 in accordance with some embodiments. The filter operation 2210 may comprise, for example, a simple string, such as "year='2017'". For EPM planning, it may be required that parts of such a filter operation 2210 can be expressed at runtime. That means that parts of the filter may be defined a design time. The rest may be expressed as a parameter. Also, filter operations in EPM planning may combine normal filter expressions and hierarchical filter expressions. Thus, the filter modeling structure 2200 may be reused by many operations and can be parameterized in a flexible way.

Thus, embodiments may provide operations for enterprise performance management related data manipulations (calculations, changes, adoptions, etc.). Embodiments may also be seen as new programming language/model for business planning. The database itself may fully support the lifecycle of instances of the model. Moreover, embodiments may allow for compilation (design time representation to runtime representation); runtime user specific model instantiation, calculation, storage of simulation data by the user; built in simulation; and/or server side management of versions of simulation data.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the systems herein may include a processor to execute program code such that the computing device operates as described.

All systems and processes discussed herein may be embodied in program code stored on one or more computer-readable media. Such media may include, for example, a floppy disk, a CD-ROM, a DVD-ROM, a Flash drive, magnetic tape, and solid state RAM or ROM storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method associated with an enterprise database, comprising:
    receiving input data from a data source in the enterprise database in accordance with an enterprise performance management planning model, stored by a processor at the enterprise database;
    performing an operation on the input data at the enterprise database to produce a predicted result, wherein the predicted result is transmittable outside the enterprise database and the input data remains inside the enterprise database;
    providing an instantiation of a prediction-specific plan data container at the enterprise database to receive the predicted result, wherein the plan data container is an in-database store that defines a structure for the predicted result; and
    storing the predicted result in a data target, wherein the data target points to a data holding entity in the instantiation of the plan data container at the enterprise database.

2. The method of claim 1, wherein the operation comprises a copy operation to automatically copy, at the enterprise database, information into the instantiation of the plan data container, wherein the copy operation includes a flag indicating if input data is to be aggregated.

3. The method of claim 1, wherein the operation comprises a disaggregation operation to automatically create, at the enterprise database, a plurality of disaggregation values, wherein the disaggregation operation includes a proportion field defining disaggregation proportions.

4. The method of claim 1, wherein the operation comprises a currency conversion operation to automatically convert, at the enterprise database, a plurality of different currency values into values of a single consolidation currency.

5. The method of claim 1, wherein the operation comprises an elimination operation to automatically identify, at the enterprise database, entries to be associated with an elimination entry.

6. The method of claim 5, further comprising:
automatically performing, at the enterprise database based on group hierarchy information, a hierarchy transformation to create at least one elimination node.

7. The method of claim 6, further comprising:
automatically posting, at the enterprise database, the elimination entry to the elimination node.

8. The method of claim 1, wherein the structure reflects at least one dimension and at least one measure of the result.

9. A non-transitory computer-readable medium storing program code, the program code executable by a computing system storing an enterprise database structure, the program code when executed by the computing system cause the computing system to:
receive input data from a data source in the enterprise database in accordance with an enterprise performance management planning model;
perform an operation on the input data at the enterprise database to produce a predicted result, wherein the predicted result is transmittable outside the enterprise database and the input data remains inside the enterprise database;
provide an instantiation of a prediction-specific plan data container at the enterprise database to receive the predicted result, wherein the plan data container is an in-database store that defines a structure for the predicted result; and
store the predicted result in a data target, wherein the data target points to a data holding entity in the instantiation of the plan data container at the enterprise database.

10. The medium of claim 9, wherein the operation comprises a copy operation to automatically copy, at the enterprise database, information into the instantiation of the plan data container, wherein the copy operation includes a flag indicating if input data is to be aggregated.

11. The medium of claim 9, wherein the operation comprises a disaggregation operation to automatically create, at the enterprise database, a plurality of disaggregation values, wherein the disaggregation operation includes a proportion field defining disaggregation proportions.

12. The medium of claim 9, wherein the operation comprises a currency conversion operation to automatically convert, at the enterprise database, a plurality of different currency values into values of a single consolidation currency.

13. The medium of claim 9, wherein the operation comprises an elimination operation to automatically identify, at the enterprise database, entries to be associated with an elimination entry.

14. The medium of claim 13, wherein execution of the instruction further cause the computer system to:
automatically performing, at the enterprise database based on group hierarchy information, a hierarchy transformation to create at least one elimination node.

15. The medium of claim 14, wherein execution of the instruction further cause the computer system to:
automatically posting, at the enterprise database, the elimination entry to the elimination node.

16. A system, comprising:
an enterprise database, containing: actual business data, and
an instantiation of a prediction-specific plan data container to receive a predicted result;
a platform coupled to the enterprise database storage element, the platform being adapted to: (i) receive input data from a data source in the enterprise database in accordance with an enterprise performance management planning model, the input data including at least some of the actual business data, (ii) perform an operation on the input data at the enterprise database to produce the predicted result, wherein the predicted result is transmittable outside the enterprise database and the input data remains inside the enterprise database, and wherein the plan data container is an in-database store that defines a structure for the predicted result and (iii) store the predicted result in a data target, wherein the data target points to a data holding entity in the instantiation of the plan data container.

17. The system of claim 5, wherein the operation comprises a copy operation to automatically copy, at the enterprise database, information into the instantiation of the plan data container, wherein the copy operation includes a flag indicating if input data is to be aggregated.

18. The system of claim 5, wherein the operation comprises a disaggregation operation to automatically create, at the enterprise database, a plurality of disaggregation values, wherein the disaggregation operation includes a proportion field defining disaggregation proportions.

19. The system of claim 5, wherein the operation comprises a currency conversion operation to automatically convert, at the enterprise database, a plurality of different currency values into values of a single consolidation currency.

20. The system of claim 5, wherein the operation comprises an elimination operation to automatically identify, at the enterprise database, entries to be associated with an elimination entry.

21. The system of claim 20, the platform being further to: (iv) automatically perform, based on group hierarchy information, a hierarchy transformation to create at least one elimination node; and (v) automatically post the elimination entry to the elimination node.

* * * * *